United States Patent
Tsai

(10) Patent No.: US 12,107,881 B2
(45) Date of Patent: Oct. 1, 2024

(54) INFORMATION SECURITY TESTING METHOD AND INFORMATION SECURITY TESTING SYSTEM OF OPEN RADIO ACCESS NETWORK BASE STATION

(71) Applicant: INSTITUTE FOR INFORMATION INDUSTRY, Taipei (TW)

(72) Inventor: Yi-Hsueh Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 223 days.

(21) Appl. No.: 17/980,062

(22) Filed: Nov. 3, 2022

(65) Prior Publication Data

US 2024/0114047 A1    Apr. 4, 2024

(30) Foreign Application Priority Data

Sep. 30, 2022   (TW) .................................. 111137125

(51) Int. Cl.
*H04L 9/40*      (2022.01)
*H04W 12/08*     (2021.01)
*H04W 48/16*     (2009.01)

(52) U.S. Cl.
CPC ...... *H04L 63/1433* (2013.01); *H04L 63/1408* (2013.01); *H04W 12/08* (2013.01); *H04W 48/16* (2013.01)

(58) Field of Classification Search
CPC ........... H04L 63/1408; H04L 63/1433; H04W 12/08; H04W 48/16
See application file for complete search history.

(56) References Cited

U.S. PATENT DOCUMENTS

| | | | |
|---|---|---|---|
| 2022/0038902 A1 | 2/2022 | Mueck | |
| 2022/0377830 A1* | 11/2022 | Mecum | H04W 48/16 |
| 2023/0046743 A1* | 2/2023 | Vaez-Ghaemi | H04B 10/25759 |
| 2023/0083011 A1* | 3/2023 | Krishnan | H04W 24/00 455/423 |
| 2023/0336261 A1* | 10/2023 | Chen | H04B 17/40 |
| 2024/0244125 A1* | 7/2024 | Muhammad | H04L 69/167 |

OTHER PUBLICATIONS

"3rd Generation Partnership Project; Technical Specification Group Services and System Aspects;Security Assurance Specification (SCAS) for the nextgeneration Node B (gNodeB) network product class", 3GPP TS 33.511 V17.1.0, Dec. 2021 (Dec. 2021), pp. 1-22.
"3rd Generation Partnership Project; Technical Specification Group Services and System Aspects;Security architecture and procedures for 5G system", 3GPP TS 33.501 V17.6.0, Jun. 2022(Jun. 2022), pp. 1-292.

* cited by examiner

*Primary Examiner* — Kostas J Katsikis
(74) *Attorney, Agent, or Firm* — Li & Cai Intellectual Property (USA) Office

(57) ABSTRACT

An information security testing method and an information security testing system of an open radio access network (O-RAN) base station are provided. The information security testing method includes at least the following steps: configuring a processing device to execute a radio resource control (RRC) signaling integrity test process to determine whether or not an RRC signaling sent by a central unit (CU) is integrity protected; and in response to determining that the RRC signaling sent by the CU is integrity protected, configuring the processing device to execute an RRC signaling security test process.

24 Claims, 18 Drawing Sheets

INFORMATION SECURITY TESTING METHOD AND INFORMATION SECURITY TESTING SYSTEM OF OPEN RADIO ACCESS NETWORK BASE STATION

CROSS-REFERENCE TO RELATED PATENT APPLICATION

This application claims the benefit of priority to Taiwan Patent Application No. 111137125, filed on Sep. 30, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an information security testing method and an information security testing system for a base station, and more particularly to an information security testing method and an information security testing system for an open radio access network (O-RAN) base station.

BACKGROUND OF THE DISCLOSURE

The existing international standards of 5th Generation Mobile Networks (5G) base station, such as 3GPP TS 33.511, require user equipment (UE) to conduct information security tests through wireless transmission, in which professional test equipment are needed to realize information security tests of tampering and replay. In addition, the current O-RAN architecture has been widely introduced into 5G base stations (hereinafter referred to as O-RAN base stations). However, international standards have not yet systematically defined information security testing methods for the O-RAN base stations.

SUMMARY OF THE DISCLOSURE

In response to the above-referenced technical inadequacies, the present disclosure provides an information security testing method and an information security testing system of an open radio access network (O-RAN) base station.

In one aspect, the present disclosure provides an information security testing method of an open radio access network (O-RAN) base station, the information security testing method includes: configuring a processing device to generate a virtual distribution unit (DU) module and execute an F1 setting process for the virtual DU module, so as to communicatively connecting the virtual DU module to a central unit (CU) of the O-RAN base station through an F1 interface, in which the CU is configured to communicatively connect a core network through an NG interface in response to the F1 setting process being executed; configuring the processing device to execute a radio resource control (RRC) setting process for the virtual DU module, so as to designate the virtual DU module and the CU to perform data transmission through the F1 interface; configuring the processing device to execute an RRC signaling integrity test process to determine whether or not an RRC signaling sent by the CU is integrity protected; and in response to determining that the RRC signaling sent by the CU is integrity protected, configuring the processing device to execute an RRC signaling security test process, in which the RRC signaling security test process includes one or more of an RRC signaling tampering test process and an RRC signaling replay test process. The RRC signaling tampering test process is executed to determine whether or not the O-RAN base station has correctly processed the received RRC signaling that triggers an integrity check failure, and the RRC signaling replay test process is executed to determine whether or not the received RRC signaling received by the O-RAN base station is replay protected.

In another aspect, the present provides an information security testing system of an open radio access network (O-RAN) base station, the information security testing system includes a memory configured to store a plurality of instructions, and a processing device coupled to the memory. The processing device is configured to read the instructions to: generate a virtual distribution unit (DU) module and executing an F1 setting process for the virtual DU module, so as to communicatively connecting the virtual DU module to a central unit (CU) of the O-RAN base station through an F1 interface, in which the CU is configured to communicatively connect a core network through an NG interface in response to the F1 setting process being executed; execute a radio resource control (RRC) setting process for the virtual DU module, so as to designate the virtual DU module and the CU to perform data transmission through the F1 interface; execute an RRC signaling integrity test process to determine whether or not an RRC signaling sent by the CU is integrity protected; and in response to determining that the RRC signaling sent by the CU is integrity protected, execute an RRC signaling security test process. The RRC signaling security test process includes one or more of an RRC signaling tampering test process and an RRC signaling replay test process, the RRC signaling tampering test process is executed to determine whether or not the O-RAN base station has correctly processed the received RRC signaling that triggers an integrity check failure, and the RRC signaling replay test process is executed to determine whether or not the received RRC signaling received by the O-RAN base station is replay protected.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
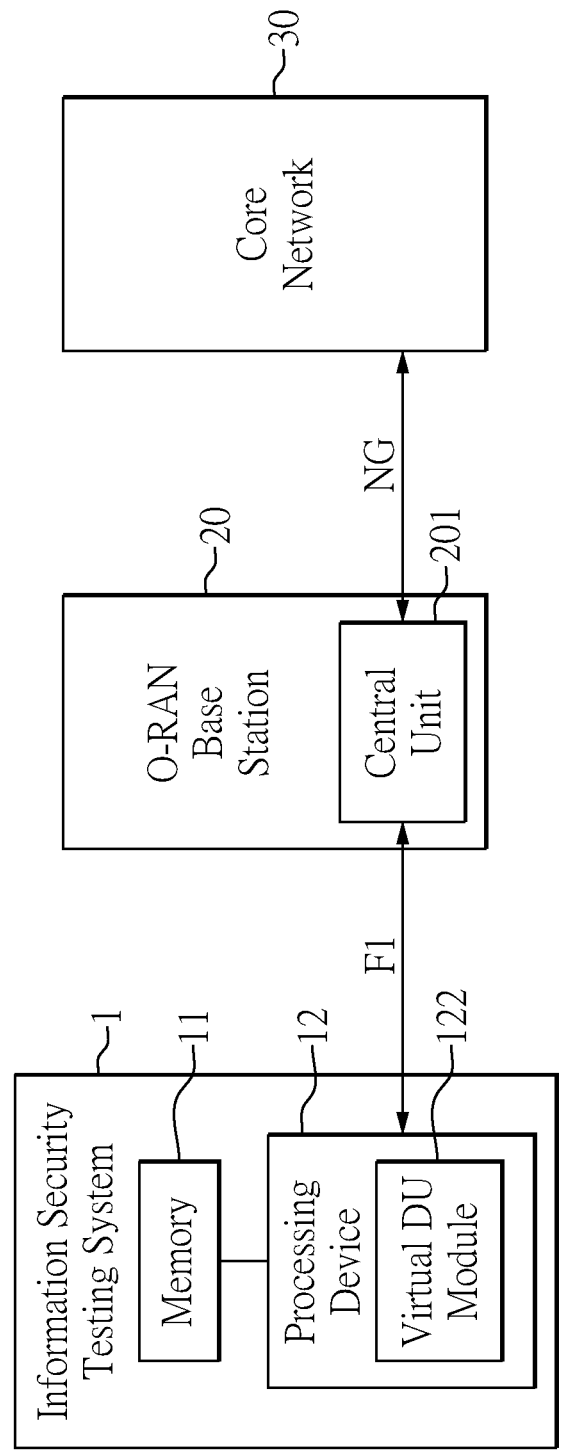
FIG. 1 is a schematic diagram of an information security testing system of an O-RAN base station according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
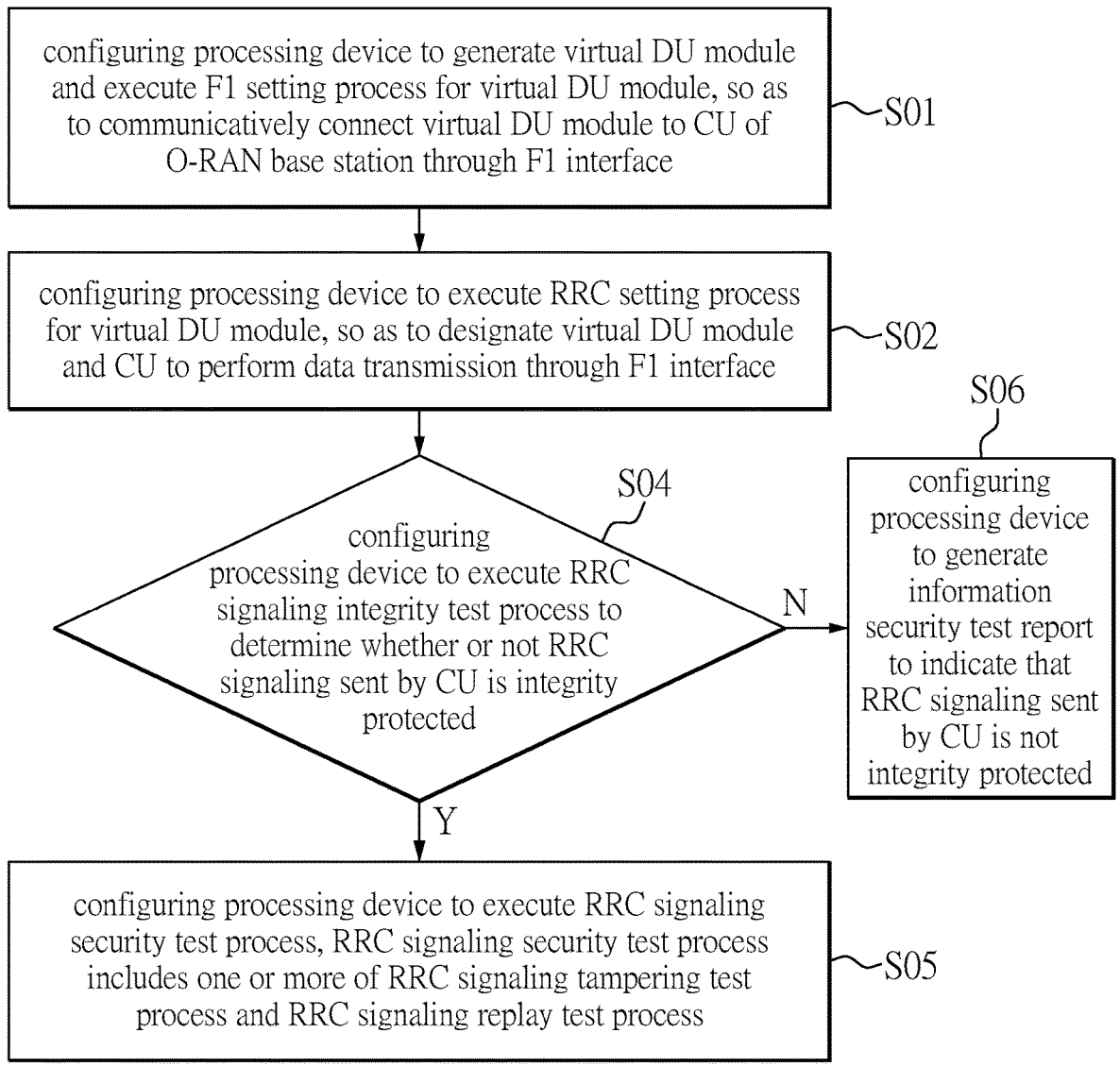
FIG. 2 is a flowchart of an information security testing method of an O-RAN base station according to a first embodiment of the present disclosure.

Reference is made to FIGS. 1 and 2, FIG. 1 is a schematic diagram of an information security testing system of an O-RAN base station according to one embodiment of the present disclosure, and FIG. 2 is a flowchart of an information security testing method of an O-RAN base station according to a first embodiment of the present disclosure. As shown in FIG. 1, the information security testing system 1 includes a memory 11 for storing a plurality of instructions (not shown in FIG. 1) and a processing device 12 coupled to the memory 11. The processing device 12 can include one or more processors that are configured to read a plurality of instructions stored in the memory 11. The memory 11 and the processing device 12 can be implemented by hardware in combination with software and/or firmware, but the present disclosure does not limit specific implementations of the memory 11 and the processing device 12.

As shown in FIG. 2, in step S01, in this embodiment, the processing device 12 is configured to generate a virtual distribution unit (DU) module 122 and execute an F1 setting process for the virtual DU module 122, so as to communicatively connect the virtual DU module 122 to a central unit (CU) 201 of an O-RAN base station 20 through the F1 interface. It should be understood that the CU 201 of the O-RAN base station 20 is configured to process high-level protocols such as a radio resource control (RRC) protocol and a packet data convergence protocol (PDCP), and the CU 201 can be configured to communicatively connect with a core network (i.e., 5G core network) 30 through an NG interface in response to the F1 setting process being executed.

Next, in step S02, the processing device 12 in this embodiment is configured to execute an RRC setting process for the virtual DU module 122, so as to designate the virtual DU module 122 and the CU 201 to perform data transmission through the F1 interface. In addition, in step S04, the processing device 12 in this embodiment is configured to execute an RRC signaling integrity test process to determine whether or not an RRC signaling sent by the CU 201 is integrity protected. If the determination is affirmative, the information security testing method proceeds to step S05; otherwise, the information security testing method proceeds to step S06.

In step S05, in response to determining that the RRC signaling sent by the CU 201 is integrity protected, the processing device 12 in this embodiment is configured to execute an RRC signaling security test process. The RRC signaling security test process includes one or more of an RRC signaling tampering test process and an RRC signaling replay test process, the RRC signaling tampering test process is executed to determine whether or not the O-RAN base station 20 has correctly processed the received RRC signaling that triggers an integrity check failure, and the RRC signaling replay test process is executed to determine whether or not the received RRC signaling received by the O-RAN base station 20 is replay protected. In addition, in step S06, in response to determining that the RRC signaling sent by the CU 201 is not integrity protected, the processing device 12 in this embodiment is configured to generate an information security test report to indicate that the RRC signaling sent by the CU 201 is not integrity protected.

Specifically, the processing device 12 can generate the virtual DU module 122 through a network component software simulator (e.g., DuSIM), and can implement information security tests of tampering and replay through a wired data transmission interface (i.e., the F1 interface). Since the processing device 12 uses the virtual DU module 122 to perform data transmission with the CU 201 of the O-RAN base station 20 through the F1 interface, an object on which the information security test of the present disclosure is performed is the CU 201 of the O-RAN base station 20, and there is no need to perform information security tests by a user equipment (UE) through wireless transmission.

Furthermore, the virtual DU module 122 provided/generated by the processing device 12 can cover functions of the UE and a physical DU, and can directly analyze messages sent by the CU 201 of the O-RAN base station 20, thus the information security tests in the present disclosure can be performed without any professional test equipment. In addition, in the present disclosure, the processing device 12 can read the instructions stored in the memory 11 to execute various processes, so as to complete a plurality of information security testing items for the O-RAN base station 20 in faster manners. Therefore, in the present disclosure, a complete and effective information security testing technique is provided on the basis of following 5G international standards (e.g., 3GPP TS 33.511).

Figure 3:
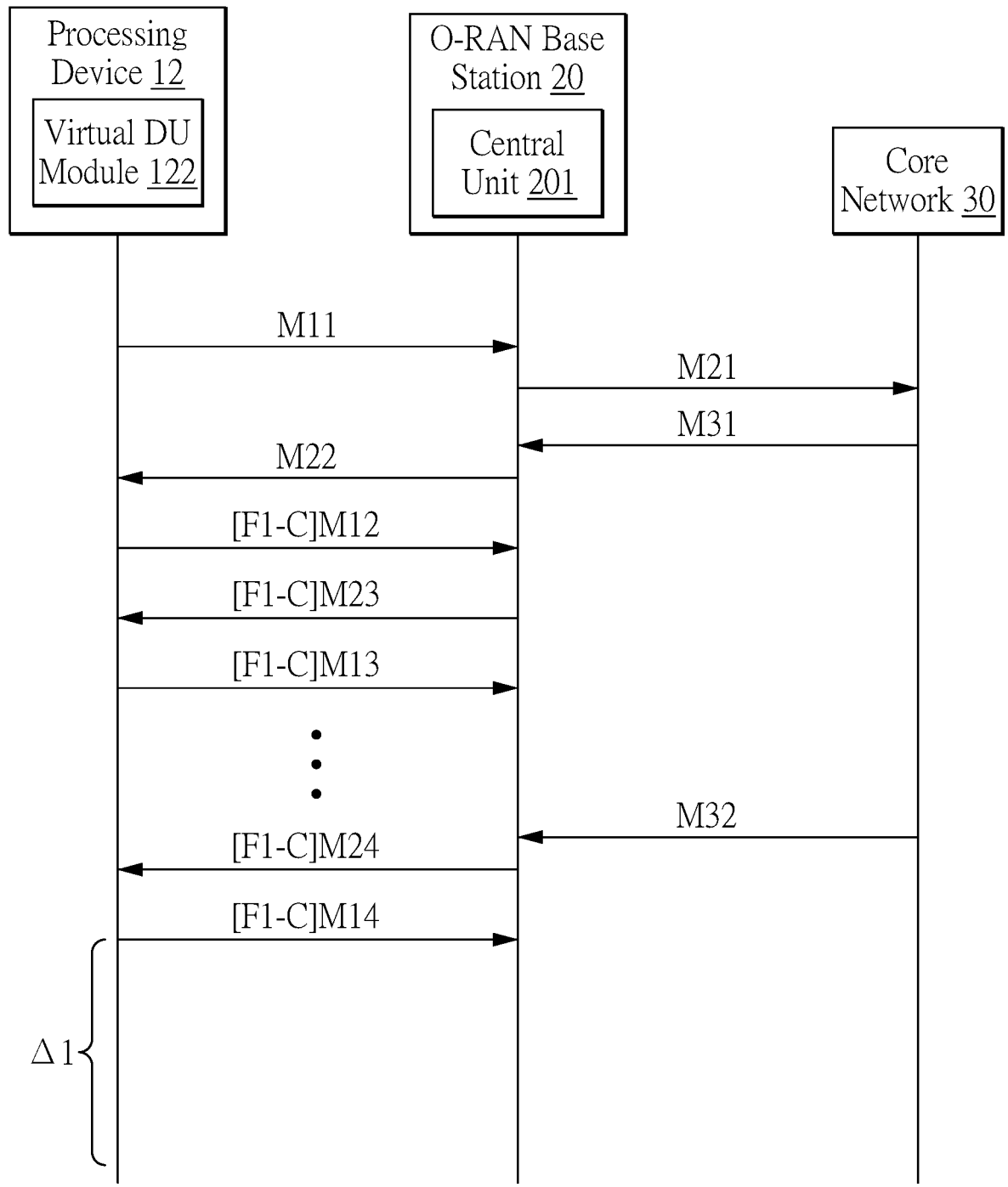
FIG. 3 is a schematic diagram showing data transmission performed by a virtual distribution unit (DU) module, a central unit (CU) and a core network according to the first embodiment of the present disclosure.

Reference is made to FIG. 3, which is a schematic diagram showing data transmission performed by a virtual DU module, a CU and a core network according to the first embodiment of the present disclosure. It should be noted that, in the embodiment of FIG. 3, the RRC signaling security test process executed by the processing device 12 that merely includes the RRC signaling tampering test process is taken as an example, and the O-RAN base station 20 has correctly processed a received RRC signaling that triggers an integrity check failure.

As shown in FIG. 3, in the step of executing the F1 setting process 12, the processing device 12 is further configured to use the virtual DU module 122 to send an F1 setup request message M11 to the CU 201 of the O-RAN base station 20. In addition, in response to receiving the F1 setup request message M11 sent by the virtual DU module 122, the CU 201 can be configured to send an NG setup request message M21 to the core network 30, and in response to receiving an F1 setup response message M31 returned by the core network 30, the CU 201 can return an F1 setup response message M22 to the virtual DU module 122, so as to establish a communicative connection over the F1 interface between the virtual DU module 122 and the CU 201.

Next, in the step of executing the RRC setup process, the processing device 12 is further configured to use the virtual DU module 122 to send an RRC setup request message M12 to the CU 201 through the F1 interface. It should be understood that the F1 interface can be further divided into an F1-C interface for transmitting control plane message and an F1-U interface for transmitting user plane message. In order to facilitate understanding of advantages and effects of the present disclosure, after the communicative connection over the F1 interface between the virtual DU module 122 and the CU 201 is established, messages sent by the virtual DU module 122 and the CU 201 in FIG. 3 to each other are denoted with [F1-C] or [F1-U], so as to indicate that the messages are actually transmitted through the F1-C interface or the F1-U interface.

In other words, the virtual DU module 122 sends the RRC setting request message M12 to the CU 201 through the F1-C interface of the F1 interface. In addition, in the step of executing the RRC setup process, the processing device 12 is further configured to, in response to receiving the RRC setup message M23, use the virtual DU module 122 to send an RRC setup complete message M13 to the CU 201 through the F1-C interface, so as to designate the virtual DU module 122 and the CU 201 to perform data transmission through the F1 interface.

Next, in the step of executing the RRC signaling integrity test process, the processing device 12 is further configured to, in response to determining that the virtual DU module 122 receives a security mode command message sent by the CU 201 through the F1 interface, determine whether or not the security mode command message includes a message authentication code for integrity (MAC-I), and in response to determining that the security mode command message includes the MAC-I, the processing device 12 is configured to determine that the RRC signaling sent by the CU 201 is integrity protected.

As shown in FIG. 3, the security mode command message can be an access stratum (AS) security mode command message M24 sent by the CU 201 through the F1-C interface, and the AS security mode command message M24 includes the MAC-I calculated by an integrity protection algorithm (e.g., NIA1 or NIA2). In a case that the security mode command message includes the MAC-I, the RRC signaling sent by the CU 201 is integrity protected. Therefore, in response to determining that the AS security mode command message M24 includes the MAC-I, the processing device 12 can determine that the RRC signaling sent by the CU 201 is integrity protected.

Figure 4:
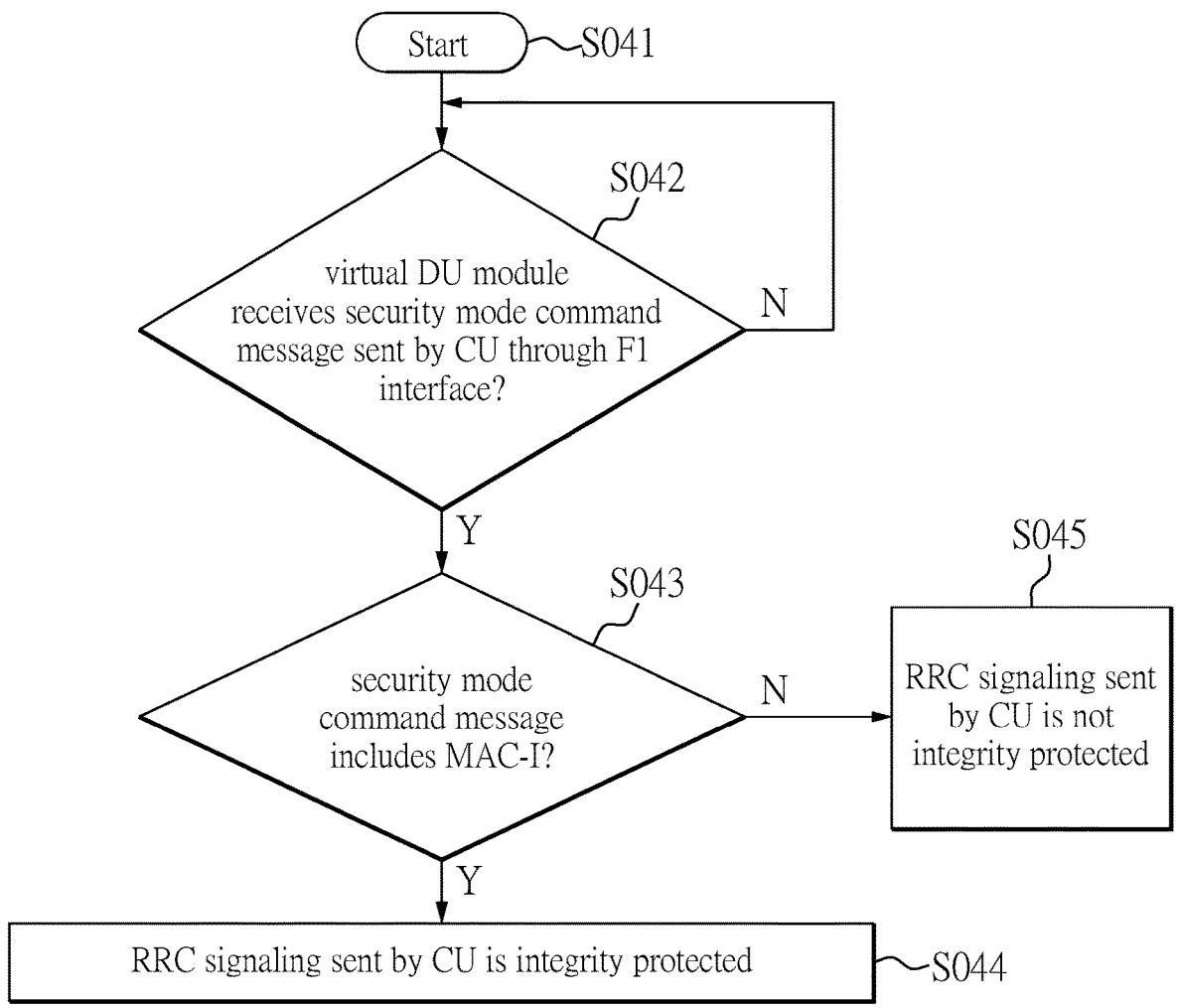
FIG. 4 is a flowchart showing that a processing device executes a radio resource control (RRC) signaling integrity test process according to one embodiment of the present disclosure.

Further, reference is made to FIG. 4, which is a flowchart showing that the processing device executes a RRC signaling integrity test process according to one embodiment of the present disclosure. As shown in FIG. 4, step S041 is the beginning of the processing device 12 executing the RRC signaling integrity test process. In step S042, the processing device 12 determines whether or not the virtual DU module 122 receives the security mode command message (e.g., the AS security mode command message M24 in FIG. 3) sent by the CU 201 through the F1 interface. If the determination is affirmative, the processing device 12 is configured to execute step S043; otherwise, the processing device 12 is configured to execute step S042 until the processing device 12 determines that the virtual DU module 122 receives the security mode command message sent by the CU 201 through the F1 interface.

In step S043, in response to determining that the virtual DU module 122 receives the security mode command message sent by the CU 201 through the F1 interface, the processing device 12 determines whether or not the security mode command message includes the MAC-I. If the determination is affirmative, the processing device 12 executes step S044 to determine that the RRC signaling sent by the CU 201 is integrity protected; otherwise, the processing device 12 executes step S045 to determine that the RRC signaling sent by the CU 201 is not integrity protected, which means that the CU 201 does not use the integrity protection algorithm (e.g., NIA1 or NIA2) for the sent RRC signaling. Therefore, it can also be determined that it is impossible for the O-RAN base station 20 to perform an integrity check on the received RRC signaling. In this case, the processing device 12 in this embodiment does not need to be reconfigured to perform the RRC signaling tampering test process to determine whether or not the O-RAN base station 20 has correctly processed the received RRC signaling that triggers the integrity check failure. In addition, in the present disclosure, the RRC signaling replay test process uses the MAC-I included in the security mode command message, thus the processing device 12 does not need to be reconfigured to perform the RRC signaling replay test process in such case.

In other words, as shown in FIG. 2, if it is determined that the RRC signaling sent by the CU 201 is not integrity protected, step S05 can be omitted in this embodiment, and the processing device 12 is configured to directly generate an information security test report to indicate that the RRC signaling sent by the CU 201 is not integrity protected. It should be noted that, in this embodiment, it is assumed that the MAC-I included in the security mode command message has a correct value, but in practice, the processing device 12 in this embodiment can also be configured to verify a correctness of the MAC-I included in the security mode command message.

Specifically, as shown in FIG. 3, before the virtual DU module 122 receives the AS security mode command message M24 sent by the CU 201, the information security testing method of this embodiment can further include configuring the processing device 12 to use a message extractor (not shown in FIG. 1) to extract an initial context setup request message M32 sent by the core network 30 to the CU 201 through the NG interface. In addition, in response to determining that the RRC signaling sent by the CU 201 is integrity protected, the information security testing method of this embodiment can further include: configuring the processing device 12 to obtain a $K_{gNB}$ key from the initial context setup request message M32, and to derive an RRC integrity key (i.e., $K_{RRCint}$) according to the $K_{gNB}$ key; and configuring the processing device 12 to verify whether or not a value of the MAC-I included in the AS security mode command message M24 is correct through the RRC integrity key.

In this embodiment, the information extractor can be, for example, test access points (TAPs). The test access points can each be a device that continuously duplicates data transmitted between the CU 201 and the core network 30 without affecting the data transmission between the CU 201 and the core network 30, and such device further provides the duplicated data to the processing device 12 for further analysis. Since obtaining the $K_{gNB}$ key, obtaining the $K_{RRCint}$ according to the $K_{gNB}$ key, and verifying the MAC-I included in the security mode command message through the $K_{RRCint}$ are known to those skilled in the art, further details thereof are omitted hereinafter. It is worth mentioning that the processing device 12 can identify whether the integrity protection algorithm used by the CU 201 is NIA1 or NIA2 from the security mode command message sent by the CU 201, and the processing device 12 must use the same integrity protection algorithm for the RRC signaling sent to the CU 201. In other words, the processing device 12 must be able to support NIA1 and NIA2.

In addition, as shown in FIG. 3, in a case that the security mode command message is the AS security mode command message M24 sent by the CU 201 through the F1-C interface, when the processing device 12 executes the RRC signaling tampering test process, the processing device 12 can use the virtual DU module 122 to send the AS security mode complete message M14 that does not include the MAC-I or includes the MAC-I with an incorrect value, to the CU 201 through the F1-C interface.

In general, if the CU 201 checks and finds that the AS security mode complete message M14 does not include the MAC-I or includes the MAC-I with the incorrect value, the CU 201 will not process the AS security mode complete message M14, that is, the CU 201 will not return a UE capability enquiry message to the virtual DU module 122. Therefore, in response to determining that the virtual DU module does not receive the UE capability enquiry message sent by the CU 201 within the first time period Δ1 after sending the AS security mode complete message M14, the processing device 12 determines that the O-RAN base station 20 has correctly processed the received RRC signaling that triggers the integrity check failure.

Figure 5:
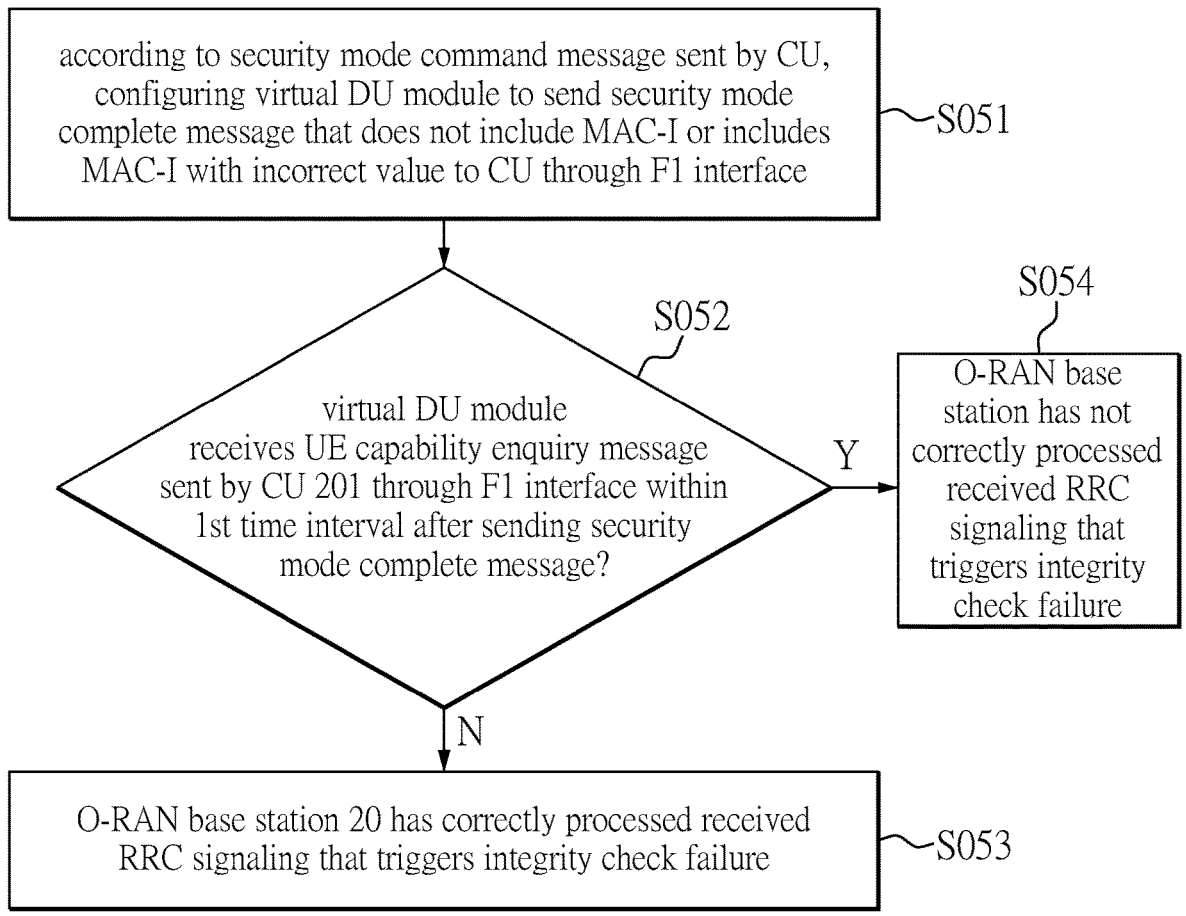
FIG. 5 is a flowchart showing that the processing device executes an RRC signaling tampering test process according to one embodiment of the present disclosure.

Further, reference is made to FIG. 5, which is a flowchart showing that the processing device executes an RRC signaling tampering test process according to one embodiment of the present disclosure. As shown in FIG. 5, in step S051, according to the security mode command message (e.g., the AS security mode command message M24 in FIG. 3) sent by the CU 201, the processing device 12 can use the virtual DU module 122 to send a security mode complete message that does not include the MAC-I or includes the MAC-I with an incorrect value (e.g., the AS security mode complete message M14 in FIG. 3) to the CU 201 through the F1 interface. Next, in step S052, the processing device 12 determines whether or not the virtual DU module 122 receives a UE capability enquiry message sent by the CU 201 through the F1 interface within the first time interval Δ1 after sending the security mode complete message. If the determination is negative, the processing device 12 executes step S053; otherwise, the processing device 12 executes step S054.

In step S053, in response to determining that the virtual DU module 122 does not received the UE capability enquiry message within the first time period Δ1, the processing device 12 can determine that the O-RAN base station 20 has correctly processed the received RRC signaling that triggers the integrity check failure. In addition, in step S054, in response to determining that the virtual DU module 122 receives the UE capability enquiry message within the first time period Δ1, the processing device 12 can determine that the O-RAN base station 20 has not correctly processed the received RRC signaling that triggers the integrity check failure. It is worth mentioning that, after step S053 or S054, the processing device 12 can also be configured to generate an information security test report to indicate whether or not the O-RAN base station 20 has correctly processed the RRC signaling that triggers the integrity check failure.

Figure 6:
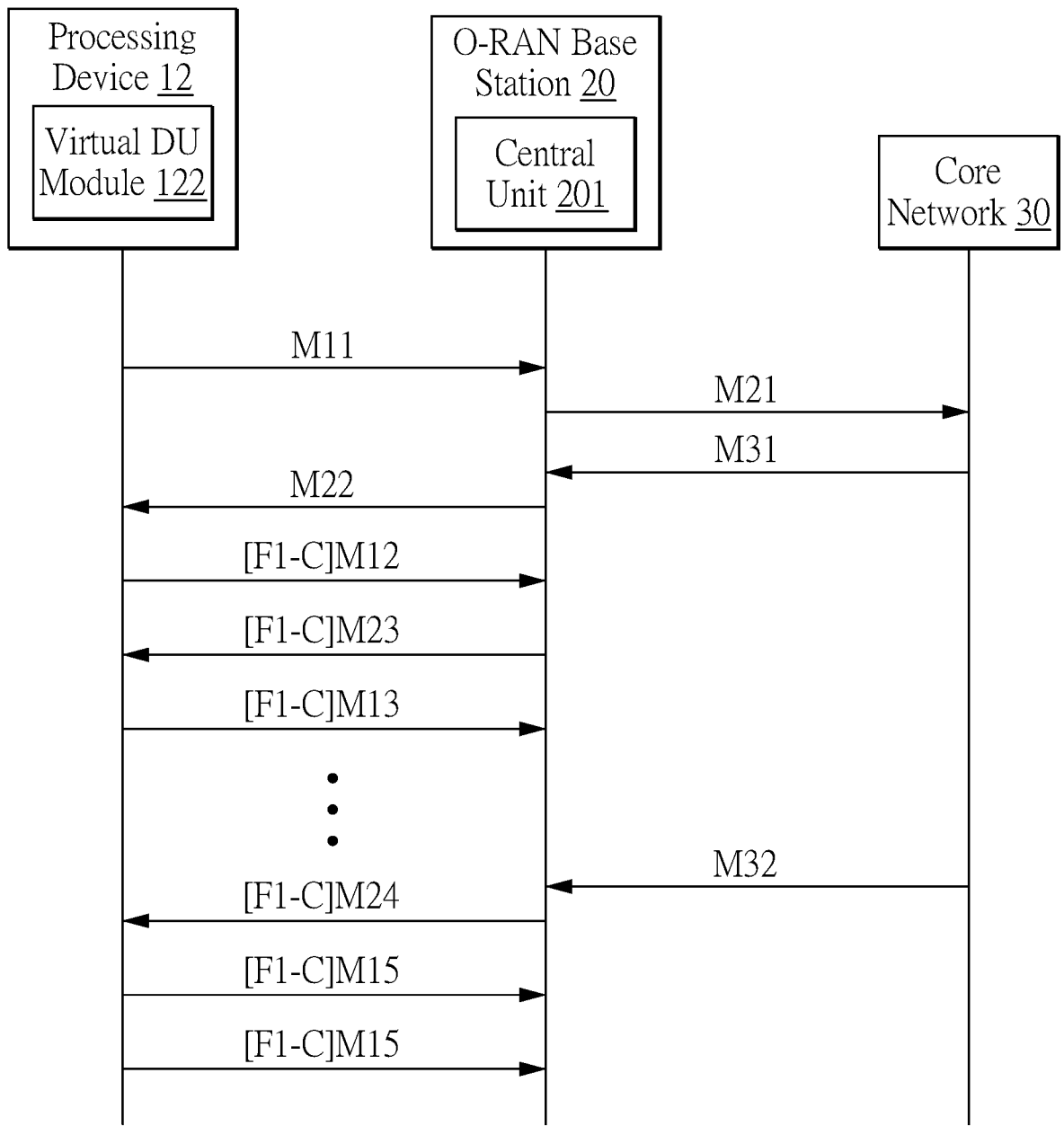
FIG. 6 is a schematic diagram showing data transmission between the virtual DU module, the CU and the core network according to a second embodiment of the present disclosure.

On the other hand, reference is made to FIG. 6, which is a schematic diagram showing data transmission between the virtual DU module, the CU and the core network according to a second embodiment of the present disclosure. It should be noted that, in the embodiment of FIG. 6, the RRC signaling security test procedure executed by the processing device 12 merely that includes the RRC signaling replay test process is taken as an example, in which the RRC signaling received by the O-RAN base station 20 is replay protected. In addition, similarities between FIG. 6 and FIG. 3 are not repeated hereinafter.

As shown in FIG. 6, when the processing device 12 executes the RRC signaling replay test process, according to the AS security mode command message M24 sent by the CU 201, the processing device 12 can use the virtual DU module 122 to send the AS security mode complete message M15 twice to the CU 201 through the F1-C interface, and a content of the AS security mode complete message M15 sent for the first time is the same as that of the AS security mode complete message M15 sent for the second time. In this embodiment, the AS security mode complete message M15 also includes an MAC-I, and the MAC-I included in the AS security mode complete message M15 is the same as the MAC-I included in the AS security mode command message M24.

In general, if the CU 201 checks and finds that the AS security mode complete message M15 sent by the virtual DU module 122 for the second time is repeated, the CU 201 will discard the AS security mode complete message M15 sent by the virtual DU module 122 for the second time, and will not send the corresponding UE capability enquiry message for the security mode complete message M15 sent by the virtual DU module for the second time. Therefore, in response to determining that the CU 201 does not send the corresponding UE capability enquiry message for the security mode complete message M15 sent by the virtual DU module for the second time, the processing device 12 determines that the RRC signaling received by the O-RAN base station 20 is replay protected.

Figure 7:
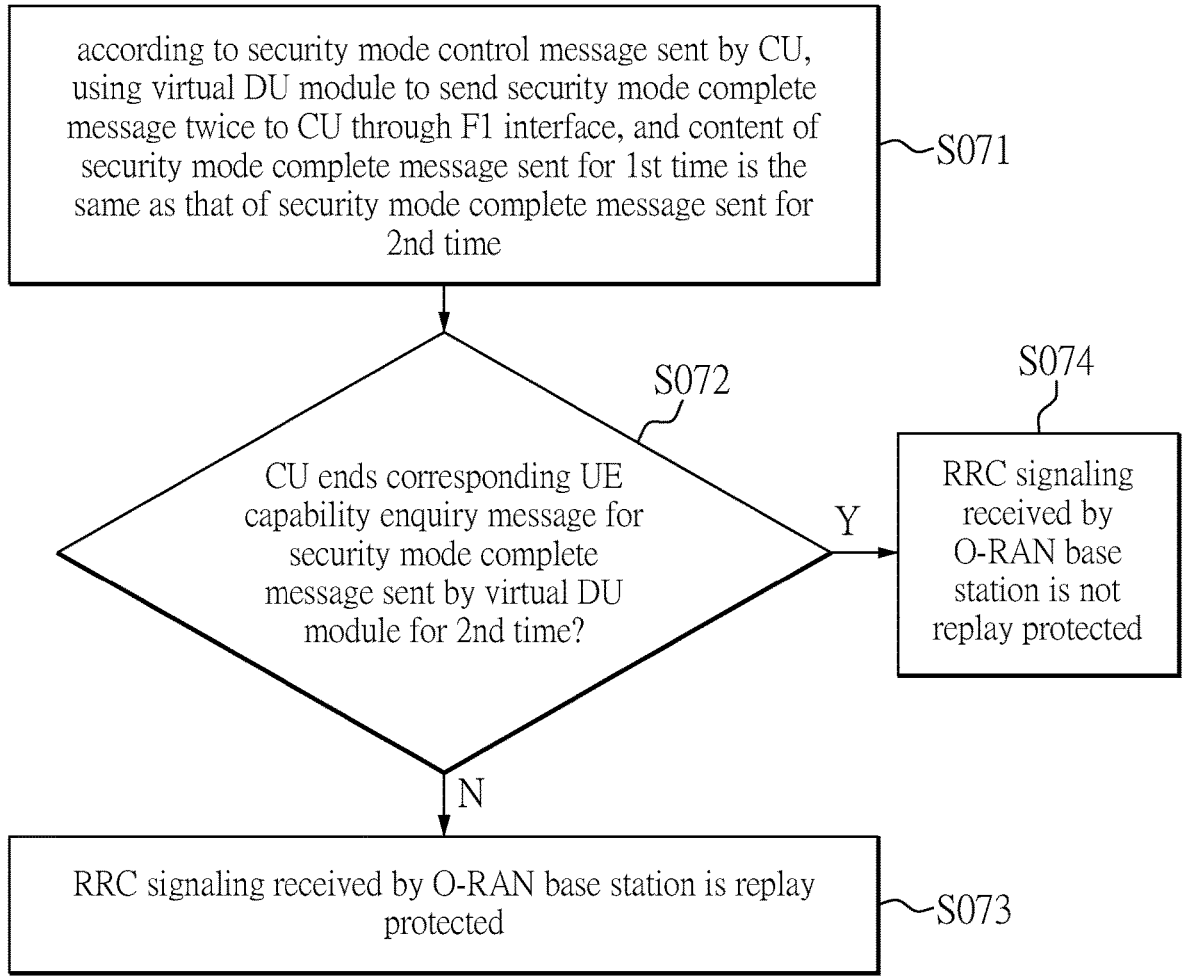
FIG. 7 is a flowchart showing that the processing device executes an RRC signaling replay test process according to one embodiment of the present disclosure.

Furthermore, reference is made to FIG. 7, which is a flowchart showing that the processing device executes an RRC signaling replay test process according to one embodiment of the present disclosure. As shown in FIG. 7, in step S071, according to the security mode control message sent by the CU 201 (e.g., the AS security mode command message M24 in FIG. 6), the processing device 12 can use the virtual DU module 122 to send the security mode complete message twice to the CU 201 through the F1 interface, and a content of the security mode complete message sent for the first time is the same as that of the security mode complete message sent for the second time (e.g., two AS security mode complete messages M15 in FIG. 6). Next, in step S072, the processing device 12 determines whether or not the CU 201 sends the corresponding UE capability enquiry message for the security mode complete message sent by the virtual DU module 122 for the second time. If the determination is negative, the processing device 12 executes step S073; otherwise, the processing device 12 executes step S074.

In step S073, in response to determining that the CU 201 does not send the corresponding UE capability enquiry message for the security mode complete message sent by the virtual DU module for the second time, the processing device 12 can determine that the RRC signaling received by the O-RAN base station 20 is replay protected. In addition, in step S074, in response to determining that the CU 201 does not send the corresponding UE capability enquiry message for the security mode complete message sent by the virtual DU module 122 for the second time, the processing device 12 can determine that the RRC signaling received by the O-RAN base station 20 is not replay protected. Similarly, after step S073 or S074, the processing device 12 can also be configured to generate an information security test report to indicate whether or not the RRC signaling received by the O-RAN base station 20 is replay protected.

Figure 8:
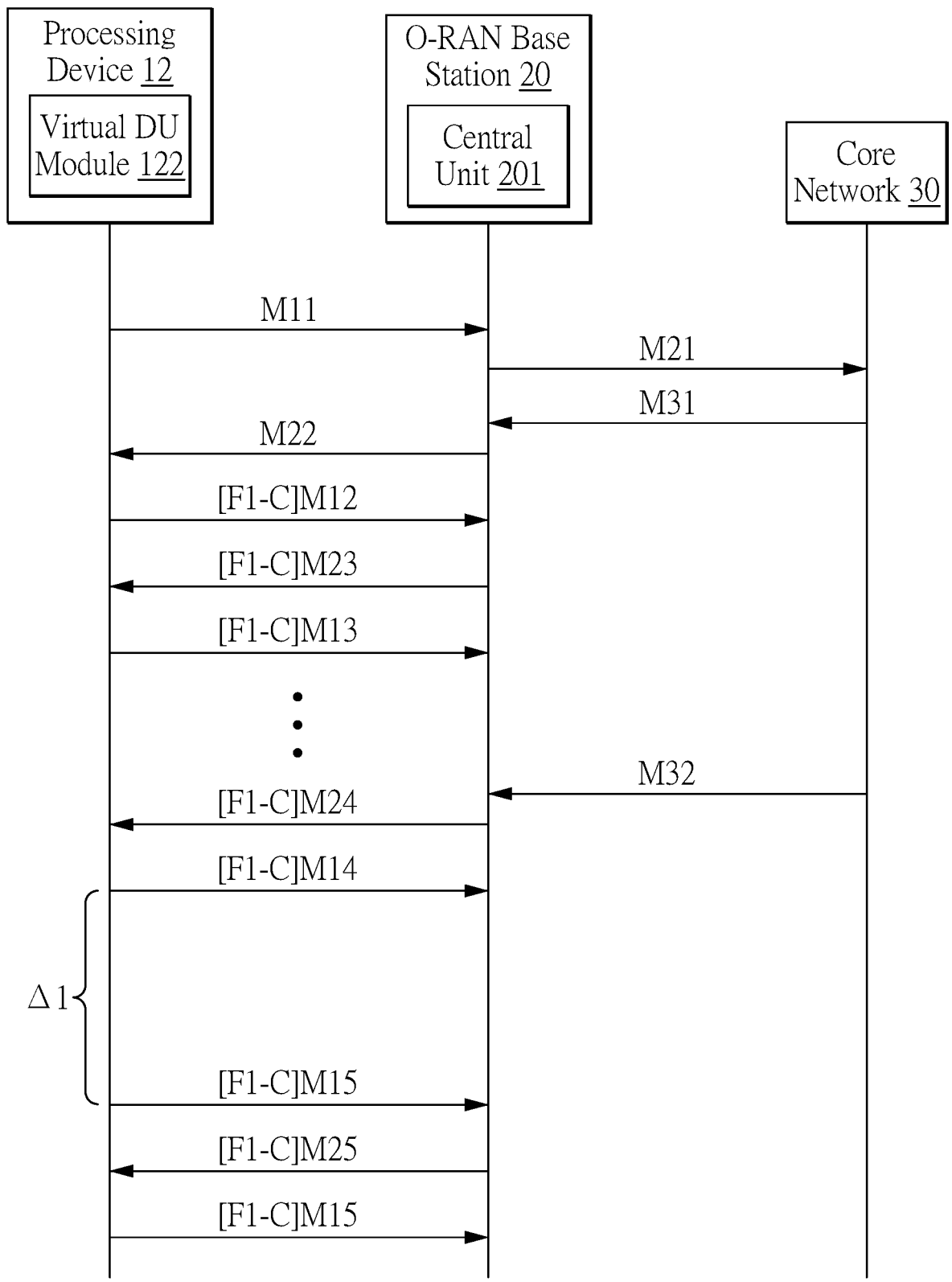
FIG. 8 is a schematic diagram showing data transmission performed by the virtual DU module, the CU and the core network according to a third embodiment of the present disclosure.
Figure 9:
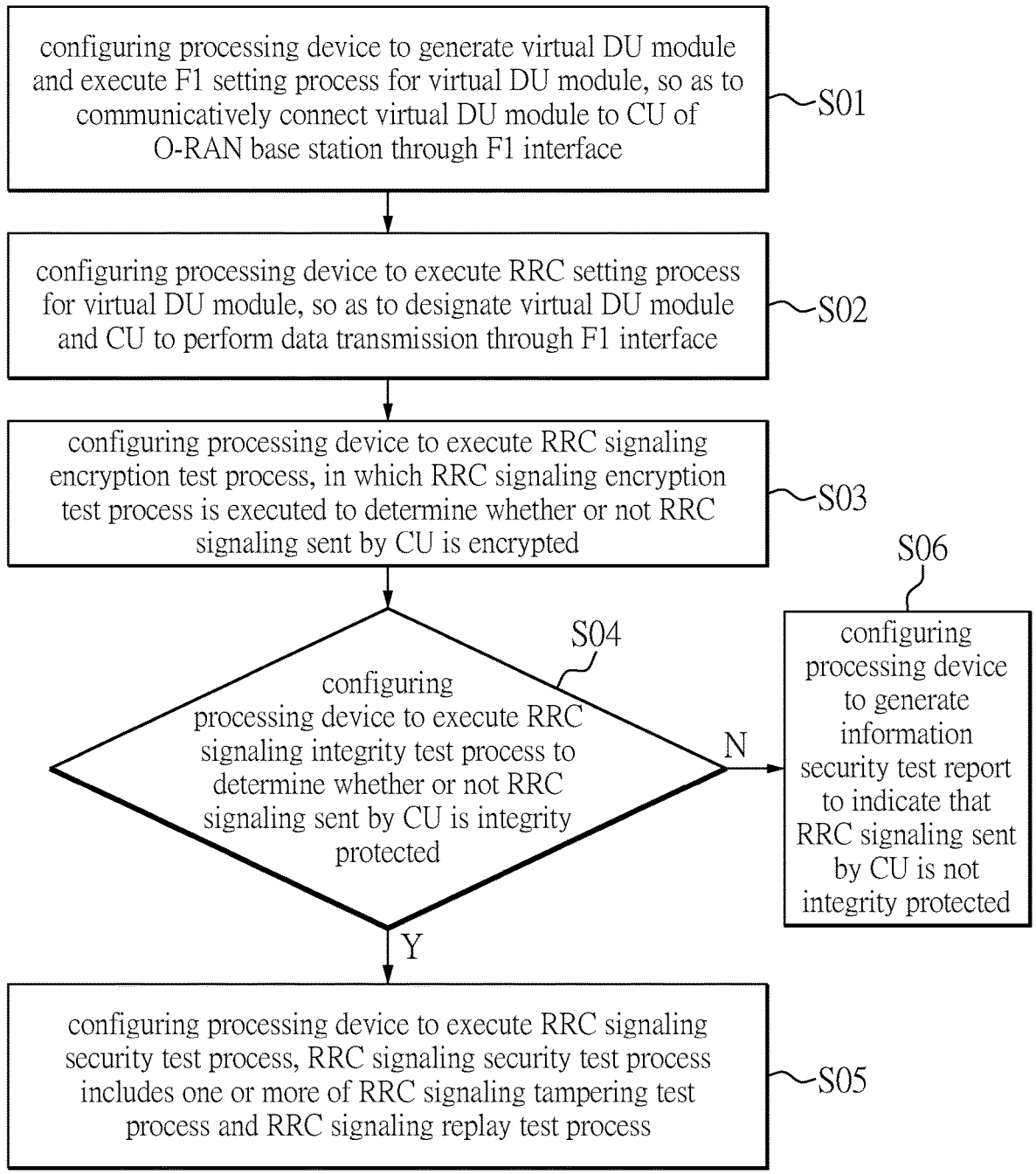
FIG. 9 is a flowchart of the information security testing method for the O-RAN base station according to the second embodiment of the present disclosure.

Furthermore, reference is made to FIG. 8, which is a schematic diagram showing data transmission performed by the virtual DU module, the CU and the core network according to a third embodiment of the present disclosure. It should be noted that, in the embodiment of FIG. 8, the RRC signaling security test process executed by the processing device 12 including the RRC signaling tampering test process and the RRC signaling replay test process is taken as an example. In addition, as shown in FIG. 8, when the processing device 12 executes the RRC signaling replay test process, after the virtual DU module 122 sends the AS security mode complete message M15 for the first time and correspondingly receives the UE capability enquiry message M25, the virtual DU module 122 then sends the AS security mode complete message M15 for the second time to the CU 20. Since the relevant details are the same as those of the embodiments in FIG. 3 and FIG. 6, repeated descriptions are omitted hereinafter. In addition, according to international standards (e.g., 3GPP TS 33.511), the RRC signaling sent by the CU 201 can also be protected by encryption. Reference is made to FIG. 9, which is a flowchart of the information security testing method for the O-RAN base station 20 according to the second embodiment of the present disclosure.

Figure 10:
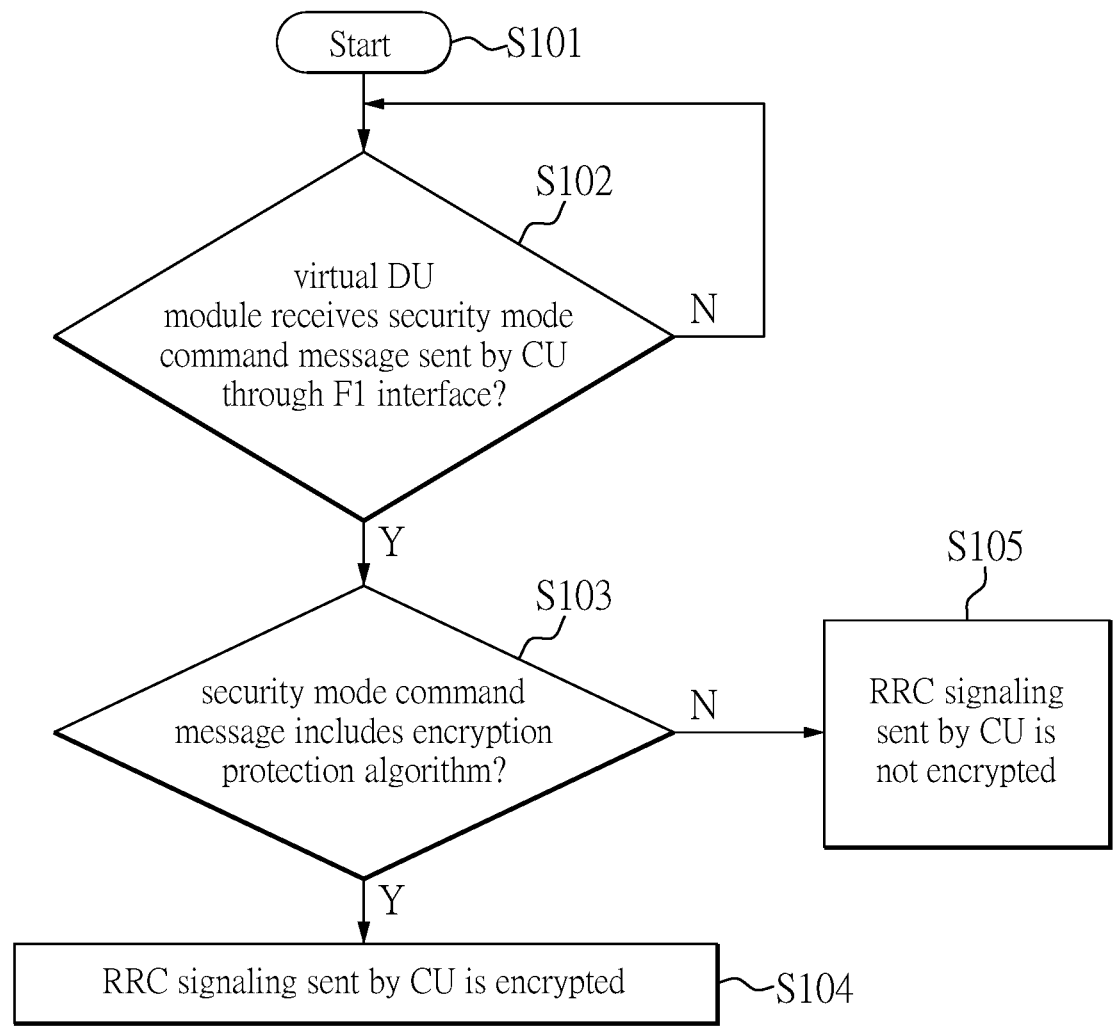
FIG. 10 is a flowchart showing that the processing device executes an RRC signaling encryption test process according to one embodiment of the present disclosure.

As shown in FIG. 9, before the processing device 12 is configured to execute the RRC signaling security test process, the information security testing method provided by the present disclosure further includes step S03. In step S03, the processing device 12 in this embodiment is configured to execute an RRC signaling encryption test process, in which the RRC signaling encryption test process is executed to determine whether or not the RRC signaling sent by the CU is encrypted. Reference is made to FIG. 10, which is a flowchart showing that the processing device executes an RRC signaling encryption test process according to one embodiment of the present disclosure.

As shown in FIG. 10, step S101 is the beginning of the processing device 12 executing the RRC signaling encryption test process. In step S102, the processing device 12 determines whether or not the virtual DU module 122 receives the security mode command message (e.g., the AS security mode command message M24 in FIG. 3) sent by the CU 201 through the F1 interface. If the determination is affirmative, the processing device 12 is configured to execute step S103; otherwise, the processing device 12 returns to execute step S102 until the processing device 12 determines that the virtual DU module 122 receives the security mode command message sent by the CU 201 through the F1 interface.

In step S103, in response to determining that the virtual DU module 122 receives the security mode command message sent by the CU 201 through the F1 interface, the processing device 12 determines whether or not the security mode command message includes an encryption protection algorithm (e.g., NEA1 or NEA2). If the determination is affirmative, the processing device 12 executes step S104 to determine that the RRC signaling sent by the CU 201 is encrypted; otherwise, the processing device 12 executes step S105 to determine that the RRC signaling sent by the CU 201 is not encrypted, which means that the CU 201 does not use the encryption protection algorithm (e.g., NEA1 or NEA2) for the sent RRC signaling.

It can be found from FIG. 10 and FIG. 4 that steps S03 and S04 can be two steps executed in parallel without conflict, therefore, a sequence of these two steps is not limited to the embodiment shown in FIG. 9. That is, if it is determined that the RRC signaling sent by the CU 201 is not integrity protected, step S05 can be omitted in the present embodiment. In addition, in step S03, the processing device 12 in this embodiment can also be configured to generate an information security test report to indicate whether or not the RRC signaling sent by the CU 201 is encrypted.

Similarly, in response to determining that the RRC signaling sent by the CU 201 is encrypted, the information security testing method of this embodiment can further include: configuring the processing device 12 to derive an RRC encryption key (i.e., $K_{RRCenc}$) according to a $K_{gNB}$ key; and configuring the processing device 12 to decode the security mode command message through the RRC encryption key to verify whether or not the security mode command message is correct. Since obtaining the $K_{RRCenc}$ according to the $K_gNB$ key and verifying the security mode command message through the $K_{RRCenc}$ are known to those skilled in the art, further details thereof are omitted hereinafter. It is worth mentioning that the processing device 12 can identify whether the encryption protection algorithm used by the CU 201 is NEA1 or NEA2 from the security mode command message sent by the CU 201, and the processing device 12 must use the same encryption protection algorithm for the RRC signaling sent to the CU 201. In other words, the processing device 12 must also be able to support NEA1 and NEA2.

Figure 11A:
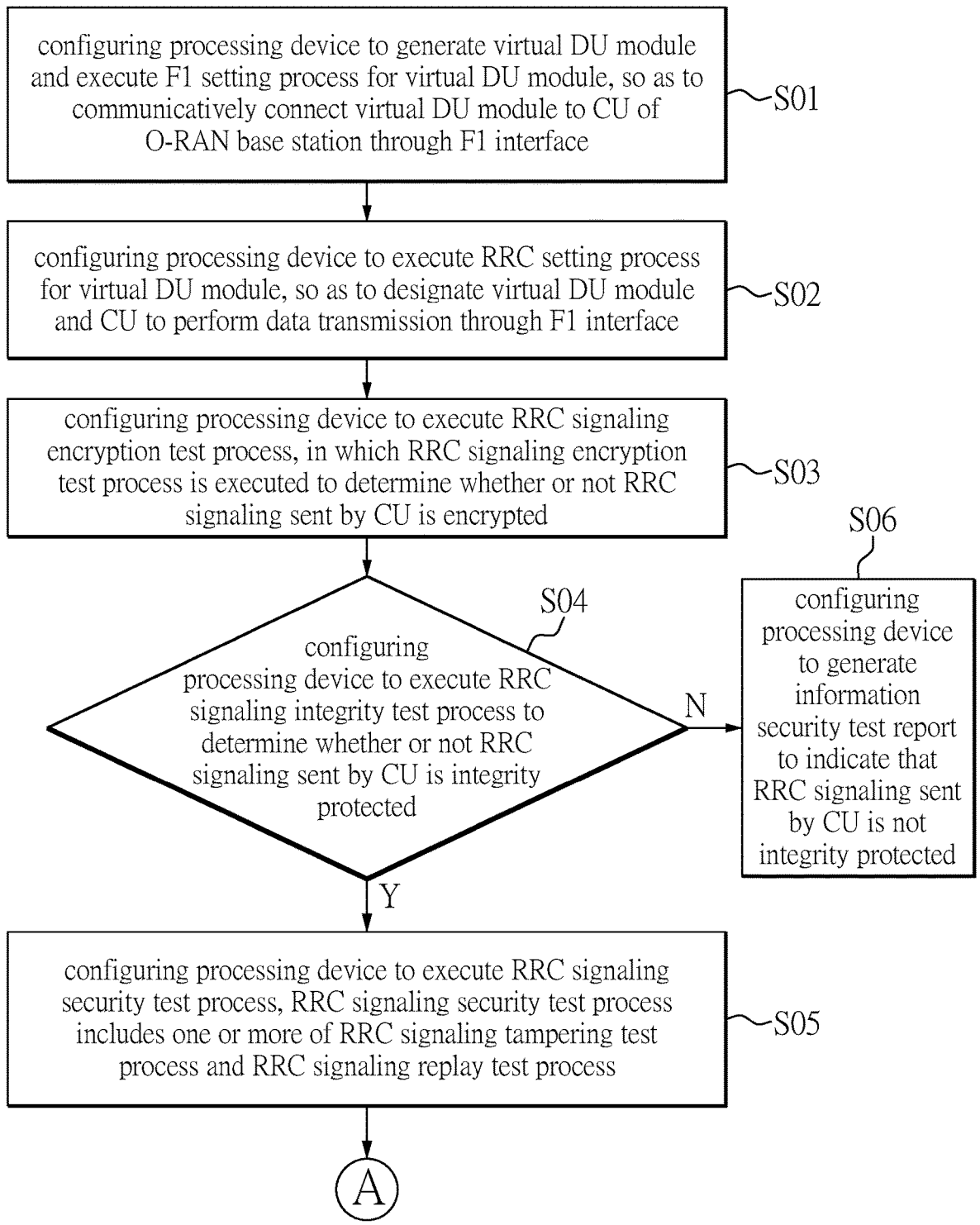
FIGS. 11A and 11B are flowcharts showing the information security testing method for the O-RAN base station according to the third embodiment of the present disclosure.

In addition, it can be seen from FIG. 2 and FIG. 9 that the information security testing methods of the foregoing embodiments are merely information security tests of tampering and/or replay for the RRC signaling of the control plane. Therefore, for further details of information security tests of tampering and/or replay for user plane data, reference can be made to FIGS. 11A and 11B, which are flowcharts showing the information security testing method for the O-RAN base station according to the third embodiment of the present disclosure, and similarities between FIG. 11A and FIG. 9 are not repeated hereinafter.

Figure 11B:
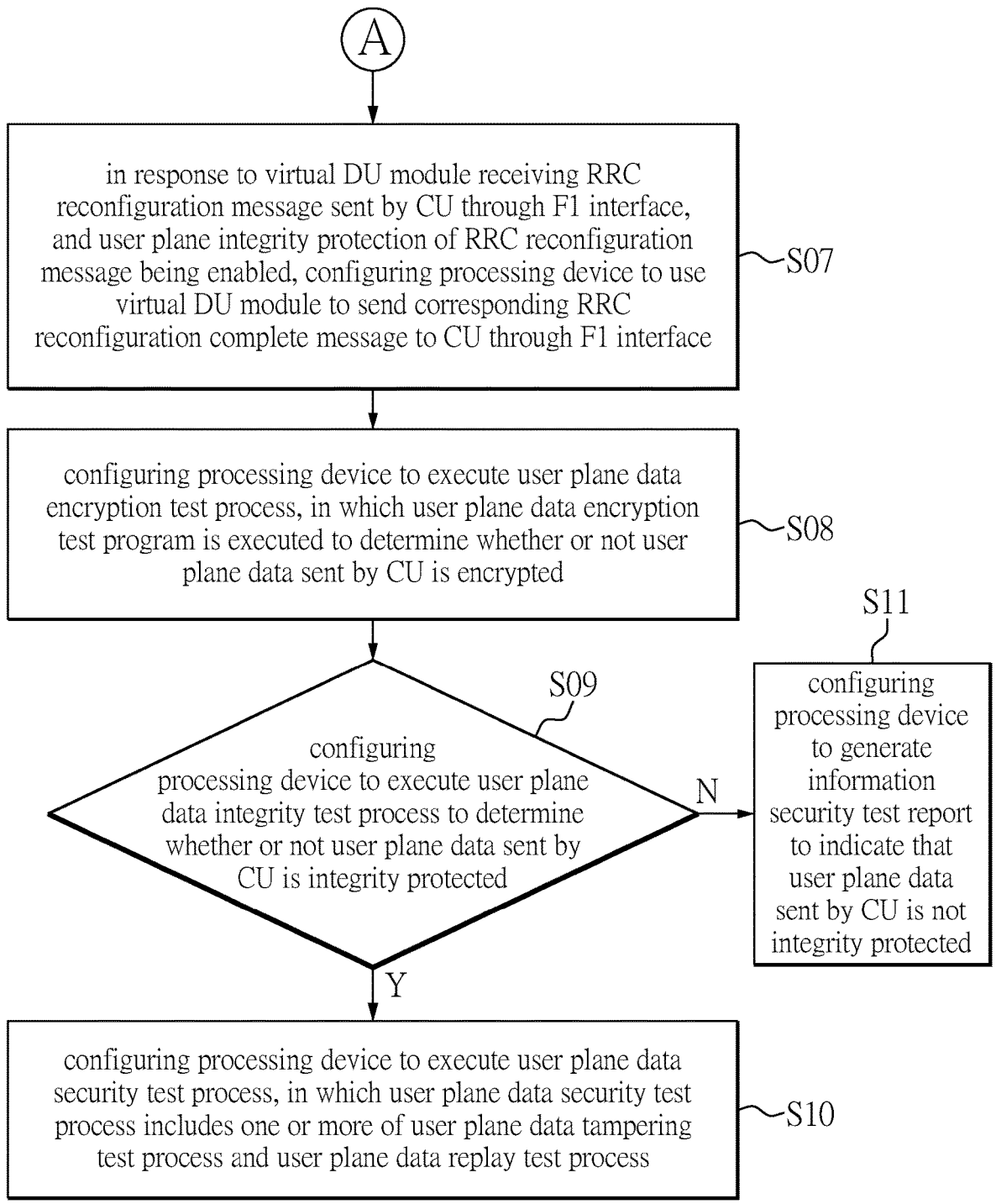

As shown in FIG. 11B, in step S07, in response to the virtual DU module 122 receiving the RRC reconfiguration message sent by the CU 201 through the F1 interface, and a user plane integrity protection of the RRC reconfiguration message being enabled, the processing device 12 in this embodiment is configured to use the virtual DU module 122 to send a corresponding RRC reconfiguration complete message to the CU 201 through the F1 interface. Next, in step S08, the processing device 12 in this embodiment is configured to execute a user plane data encryption test process, in which the user plane data encryption test program is executed to determine whether or not the user plane data sent by the CU 201 is encrypted. In addition, in step S09, the processing device 12 in this embodiment is configured to execute a user plane data integrity test process to determine whether or not the user plane data sent by the CU 201 is integrity protected. If the determination is affirmative, the information security testing method proceeds to step S10; otherwise, the information security testing method proceeds to step S11.

In step S10, in response to determining that the user plane data sent by the CU 201 is integrity protected, the processing device 12 in this embodiment is configured to execute a user plane data security test process. The user plane data security test process includes one or more of a user plane data tampering test process and a user plane data replay test process, the user plane data tampering test process is executed to determine whether or not the O-RAN base station 20 has correctly processed the received user plane data that triggers an integrity check failure, and the user plane data replay test process is executed to determining whether or not the user plane data received by the O-RAN base station 20 is replay protected. In addition, similar to step S06, the processing device 12 in this embodiment is configured to generate an information security test report in step S11 to indicate that the user plane data sent by the CU 201 is not integrity protected.

Figure 12:
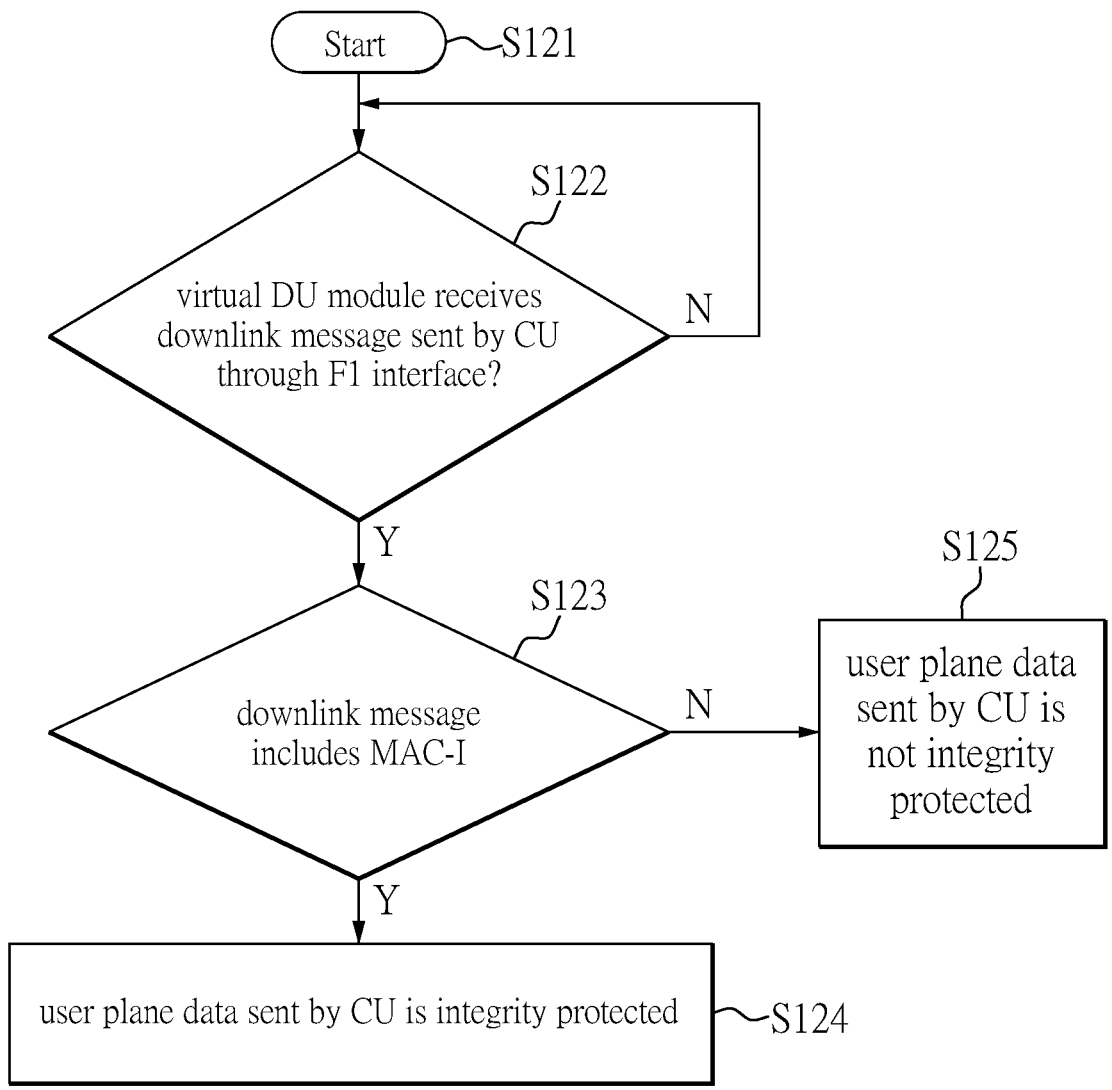
FIG. 12 is a flowchart showing that the processing device executes a user plane data integrity test process according to one embodiment of the present disclosure.

Reference is made to FIG. 12, which is a flowchart showing that the processing device executes a user plane data integrity test process according to one embodiment of the present disclosure. As shown in FIG. 12, step S121 is the beginning of the processing device 12 executing the user plane data integrity test process, and in step S122, the processing device 12 determines whether or not the virtual DU module 122 receives a downlink message sent by the CU 201 through the F1 interface. If the determination is affirmative, the processing device 12 is configured to execute step S123; otherwise, the processing device 12 returns to execute step S102 until the processing device 12 determines that the virtual DU module 122 receives the downlink message sent by the CU 201 through the F1 interface.

In step S123, in response to determining that the virtual DU module 122 receives the downlink message sent by the CU 201 through the F1 interface, the processing device 12 determines whether or not the downlink message includes the MAC-I. If the determination is affirmative, the processing device 12 executes step S124 to determine that the user plane data sent by the CU 201 is integrity protected; otherwise, the processing device 12 executes step S125 to determine that the user plane data sent by the CU 201 is not integrity protected, which means that the CU 201 does not use the integrity protection algorithm (e.g., NIA1 or NIA2) for the sent user plane data.

Similarly, if it is determined that the user plane data sent by the CU 201 is not integrity protected, step S10 can be omitted in this embodiment, and the processing device 12 can be configured to directly generate an information security test report to indicate the user plane data sent by the CU 201 is not integrity protected. In addition, in response to determining that the user plane data sent by the CU 201 is integrity protected, the information security testing method of this embodiment can further include: configuring the processing device 12 to derive a user plane integrity key (i.e., $K_{UPint}$) according to a $K_{gNB}$ key; and configuring the processing device 12 to verify whether or not a value of the MAC-I included in the downlink message is correct through the user plane integrity key (i.e., $K_{UPint}$). Since obtaining the $K_{UPint}$ according to the $K_{gNB}$ key and verifying the MAC-I included in the downlink message through the $K_{UPint}$ are all known to those skilled in the art, further details thereof are omitted hereinafter.

Figure 13:
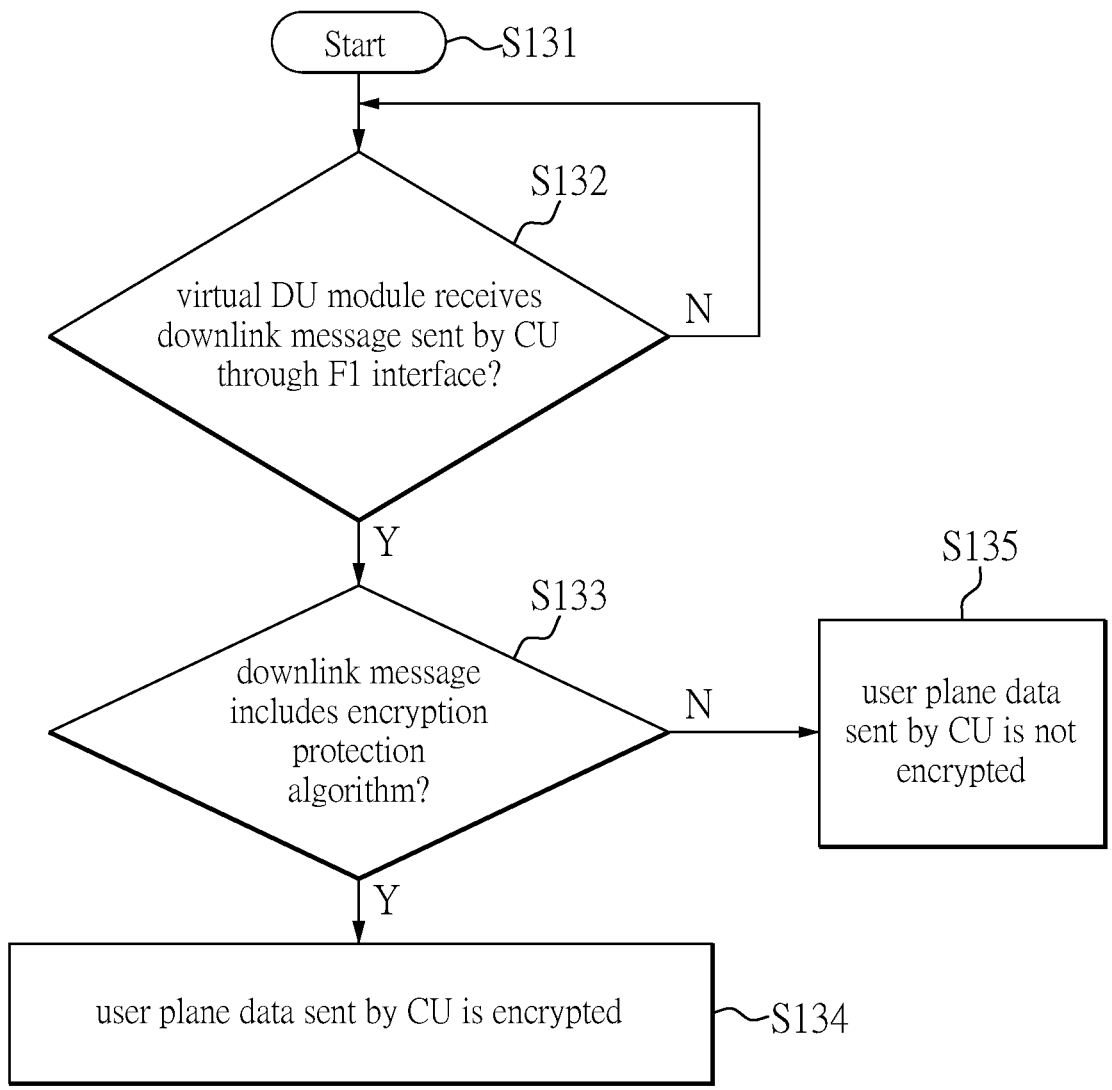
FIG. 13 is a flowchart showing that the processing device executes a user plane data encryption test process according to one embodiment of the present disclosure.

Reference is made to FIG. 13, which is a flowchart showing that the processing device executes a user plane data encryption test process according to one embodiment of the present disclosure. As shown in FIG. 13, step S131 is the beginning of the processing device 12 executing the user plane data encryption test process. In step S132, the processing device 12 determines whether or not the virtual DU module 122 receives the downlink message sent by the CU 201 through the F1 interface. If the determination is affirmative, the processing device 12 is configured to execute step S133; otherwise, the processing device 12 returns to execute step S132 until the processing device 12 determines that the virtual DU module 122 receives the downlink message sent by the CU 201 through the F1 interface.

In step S133, in response to determining that the virtual DU module 122 receives the downlink message sent by the CU 201 through the F1 interface, the processing device 12 determines whether or not the downlink message includes the encryption protection algorithm (e.g., NEA1 or NEA2). If the determination is affirmative, the processing device 12 executes step S134 to determine that the user plane data sent by the CU 201 is encrypted; otherwise, the processing device 12 executes step S135 to determine that the user plane data sent by the CU 201 is not encrypted, which means that the CU 201 does not use the encryption protection algorithm (e.g., NEA1 or NEA2) for the sent user plane data.

It can be found from FIG. 13 and FIG. 12 that steps S08 and S09 can be two steps executed in parallel without conflict, therefore, a sequence of these two steps is not limited to the embodiment shown in FIGS. 11A and 11B. That is, if it is determined that the user plane data sent by the CU 201 is not integrity protected, step S10 can be omitted in the present embodiment. In addition, in step S08, the processing device 12 in this embodiment can also be configured to generate an information security test report to indicate whether or not the user plane data sent by the CU 201 is encrypted.

Similarly, in response to determining that the user plane data sent by the CU 201 is encrypted, the information security testing method of this embodiment can further include: configuring the processing device 12 to derive the user plane data encryption key (i.e., $K_{UPenc}$) according to the $K_{gNB}$ key; and configuring the processing device 12 to decode the downlink message through the user plane data encryption key to verify whether or not the downlink message is correct. Since both obtaining $K_{UPenc}$ according to the $K_{gNB}$ key and verifying the downlink message through the $K_{UPenc}$ are known to those skilled in the art, further details thereof are omitted hereinafter. It should be understood that in other embodiments, step S08 may be omitted without considering the information security test of encrypting the user plane data. In addition, other embodiments can omit steps S03 to S06 when only considering the information security tests of tampering and/or replay the user plane data.

Figure 14:
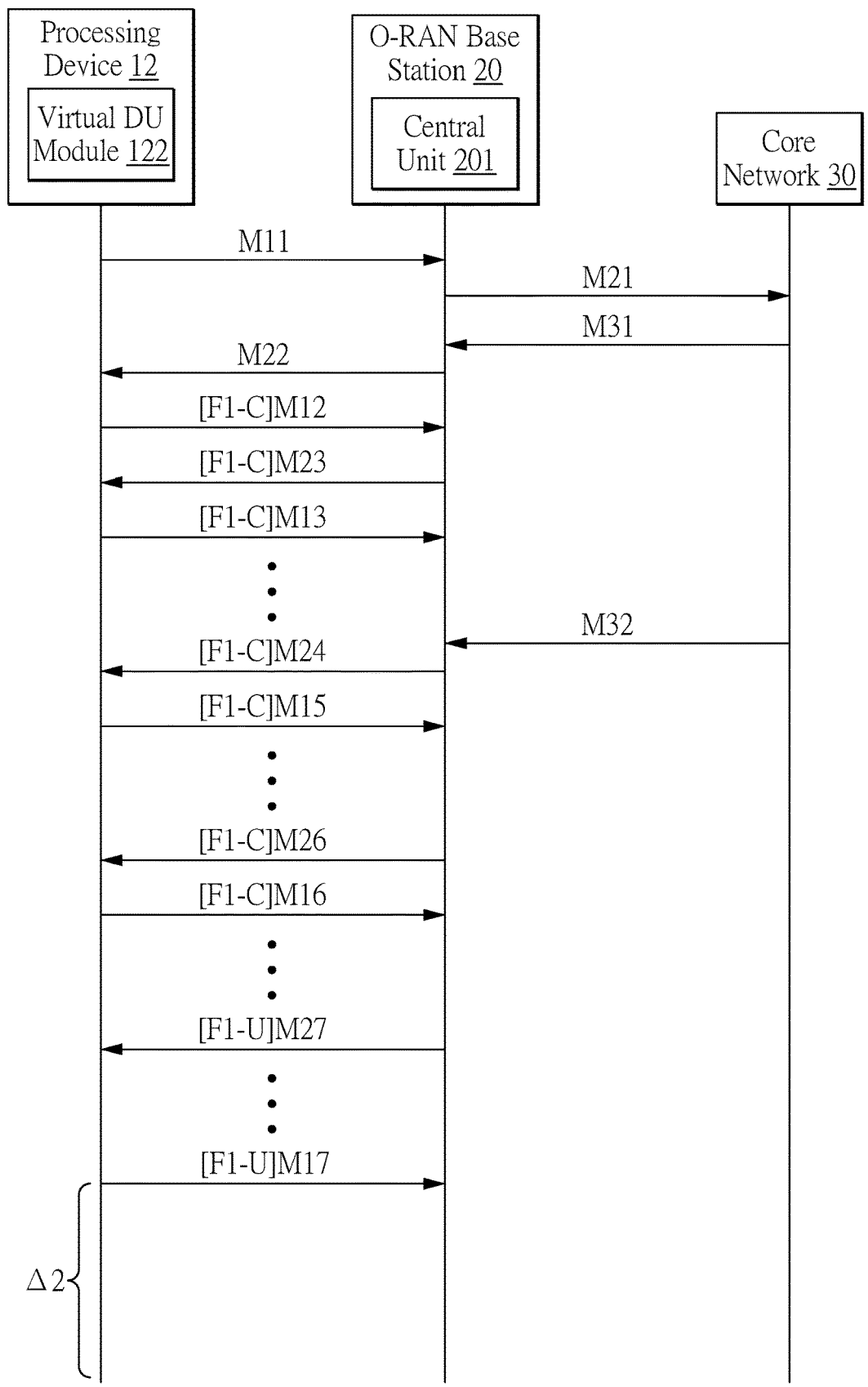
FIG. 14 is a schematic diagram showing data transmission between the virtual DU module, the CU and the core network according to a fourth embodiment of the present disclosure.

Specifically, reference is made to FIG. 14, which is a schematic diagram showing data transmission between the virtual DU module, the CU and the core network according to a fourth embodiment of the present disclosure. It should be noted that, in the embodiment of FIG. 14, the user plane data security test process executed by the processing device 12 that merely includes the user plane data tampering test process is taken as an example, in which the O-RAN base station 20 has correctly processed the user plane data that triggers the integrity check failure.

As shown in FIG. 14, in response to the virtual DU module 122 receiving the RRC reconfiguration message M26 sent by the CU 201 through the F1-C interface, and the user plane integrity protection of the RRC reconfiguration message M26 being enabled, the processing device 12 is configured to use the virtual DU module 122 to send the corresponding RRC reconfiguration complete message M16 to the CU 201 through the F1-C interface. Next, according to the downlink message M27 received by the virtual DU module 122 sent by the CU 201 through the F1-U interface, the processing device 12 can determine whether or not the user plane data sent by the CU 201 is integrity protected.

After it is determined that the user plane data sent by the CU 201 is integrity protected, when the processing device 12 executes the user plane data tampering test process, according to the downlink message M27 sent by the CU 201, the processing device 12 can use the virtual DU module 122 to send an uplink message M17 to the CU 201 through the F1-U interface that does not includes the MAC-I or includes the MAC-I with an incorrect value.

In general, if the CU 201 checks and finds that the uplink message M17 does not include the MAC-I or includes the MAC-I with the incorrect value, the CU 201 will not process the uplink message M17, that is, the CU 201 will not send the uplink message M17 to the core network 30 through the NG interface. Therefore, in response to determining that the CU 201 does not send the uplink message M17 to the core network 30 through the NG interface within the second time period Δ2, the processing device 12 can determine that the O-RAN base station 20 has correctly processed the received user plane data that triggers the integrity check failure.

Figure 15:
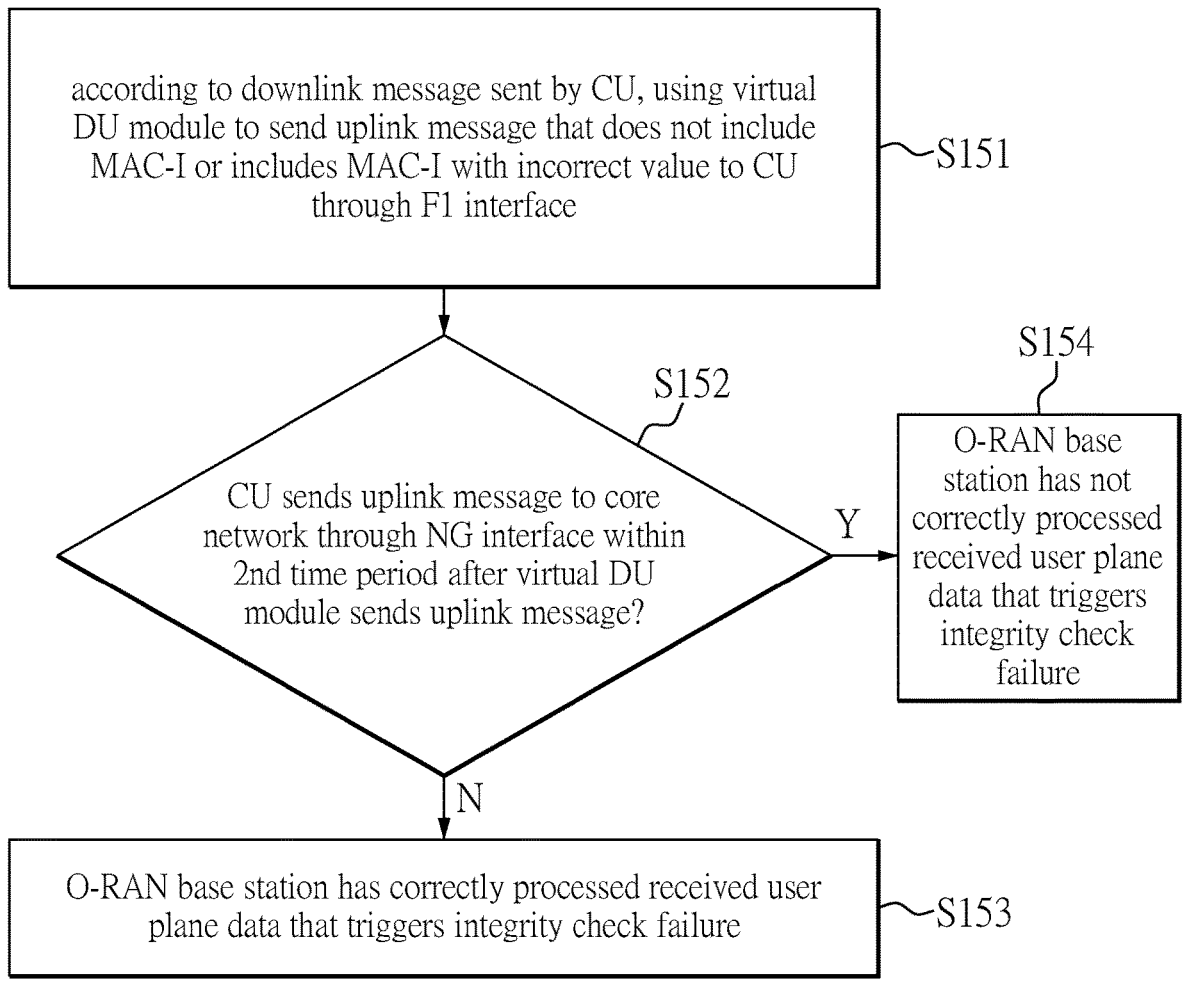
FIG. 15 is a flowchart showing that the processing device executes a user plane data tampering test process according to one embodiment of the present disclosure.

Further, reference is made to FIG. 15, which is a flowchart showing that the processing device executes a user plane data tampering test process according to one embodiment of the present disclosure. As shown in FIG. 15, in step S151, according to the downlink message M27 sent by the CU 201, the processing device 12 can use the virtual DU module 122 to send the uplink message that does not include the MAC-I or includes the MAC-I with an incorrect value to the CU 201 through the F1 interface. Next, in step S152, the processing device 12 determines whether or not the CU 201 sends the uplink message M17 to the core network 30 through the NG interface within the second time period Δ2 after the virtual DU module 122 sends the uplink message M17. If the determination is negative, the processing device 12 executes step S153; otherwise, the processing device 12 executes step S154.

In step S153, in response to determining that the CU 201 does not send the uplink message M17 to the core network 30 through the NG interface within the second time period Δ2, the processing device 12 determines that the O-RAN base station 20 has correctly processed the received user plane data that triggers the integrity check failure. In addition, in step S154, in response to determining that the CU 201 sends the uplink message M17 to the core network 30 through the NG interface within the second time period Δ2, the processing device 12 determines that the O-RAN base station 20 has not correctly processed the user plane data that triggers the integrity check failure. Similarly, after step S153 or S154, the processing device 12 can also be configured to generate an information security test report to indicate whether or not the O-RAN base station 20 has correctly processed the user plane data that triggers the integrity check failure.

Figure 16:
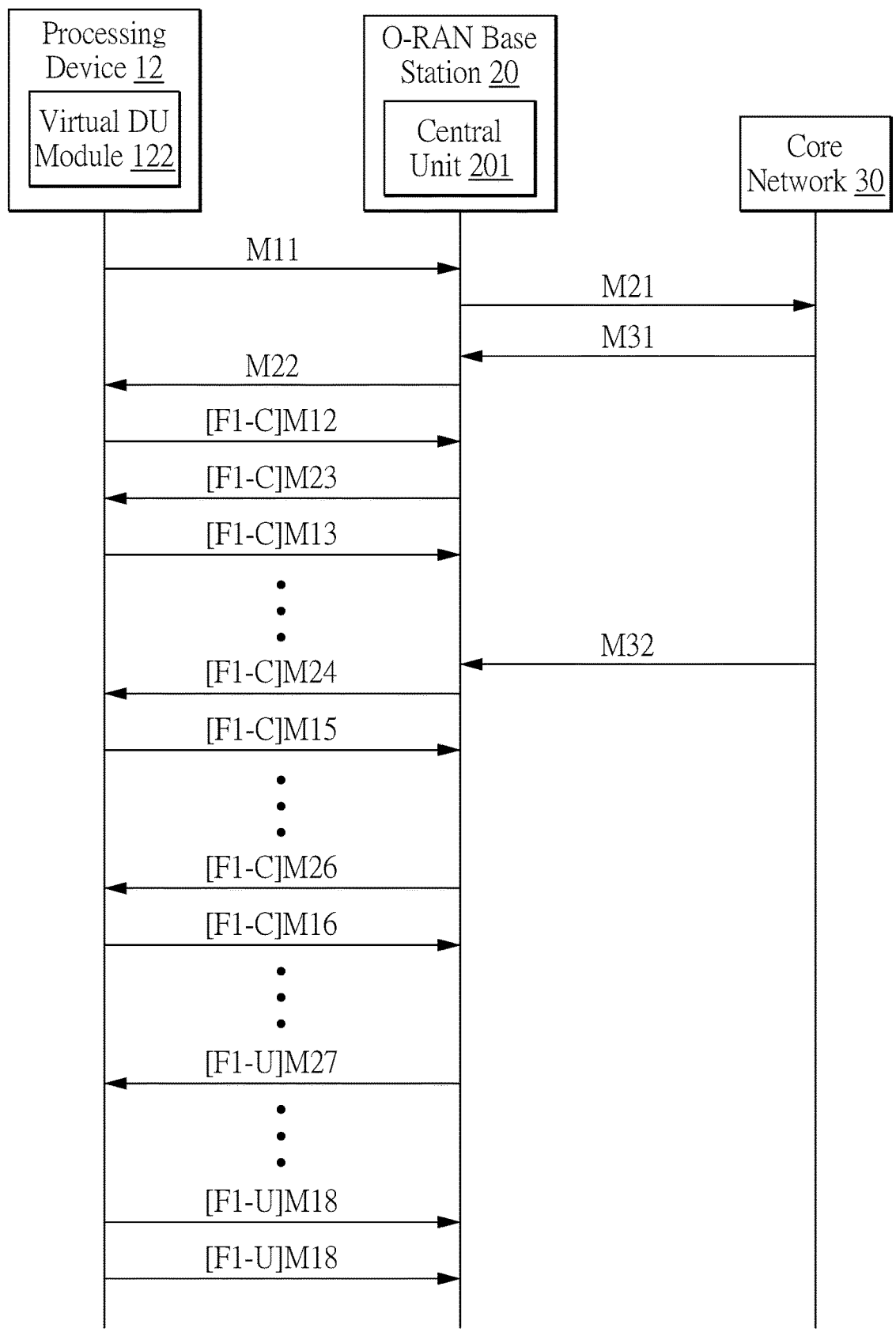
FIG. 16 is a schematic diagram showing data transmission between the virtual DU module, the CU and the core network according to a fifth embodiment of the present disclosure.

On the other hand, reference is made to FIG. 16, which is a schematic diagram showing data transmission between the virtual DU module, the CU and the core network according to a fifth embodiment of the present disclosure. It should be noted that, in the embodiment of FIG. 16, the user plane data security test process executed by the processing device 12 that only includes the user plane data replay test process is taken as an example, in which the user plane data received by the O-RAN base station 20 is replay protected. In addition, similarities between FIG. 16 and FIG. 15 are not repeated hereinafter.

As shown in FIG. 16, when the processing device 12 executes the user plane data replay test process, according to the downlink message M27 sent by the CU 201, the processing device 12 can use the virtual DU module 122 to send the uplink message M18 twice to the CU 201 through the F1-U interface, and a content of the uplink message M18 sent for the first time is the same as that of the uplink message M18 sent for the second time. In this embodiment, the uplink message M18 also includes the MAC-I, and the MAC-I included in the uplink message M18 is the same as the MAC-I included in the downlink message M27.

In general, if the CU 201 checks and finds that the uplink message M18 sent by the virtual DU module 122 for the second time is repeated, the CU 201 will not send the uplink message M18 sent by the virtual DU module for the second time to the core network 30 through the NG interface. Therefore, in response to determining that the CU 201 does not send the uplink message M18 sent by the virtual DU module 122 for the second time to the core network 30 through the NG interface, the processing device 12 can determine that the user plane data received by the O-RAN base station 20 is replay protected.

Figure 17:
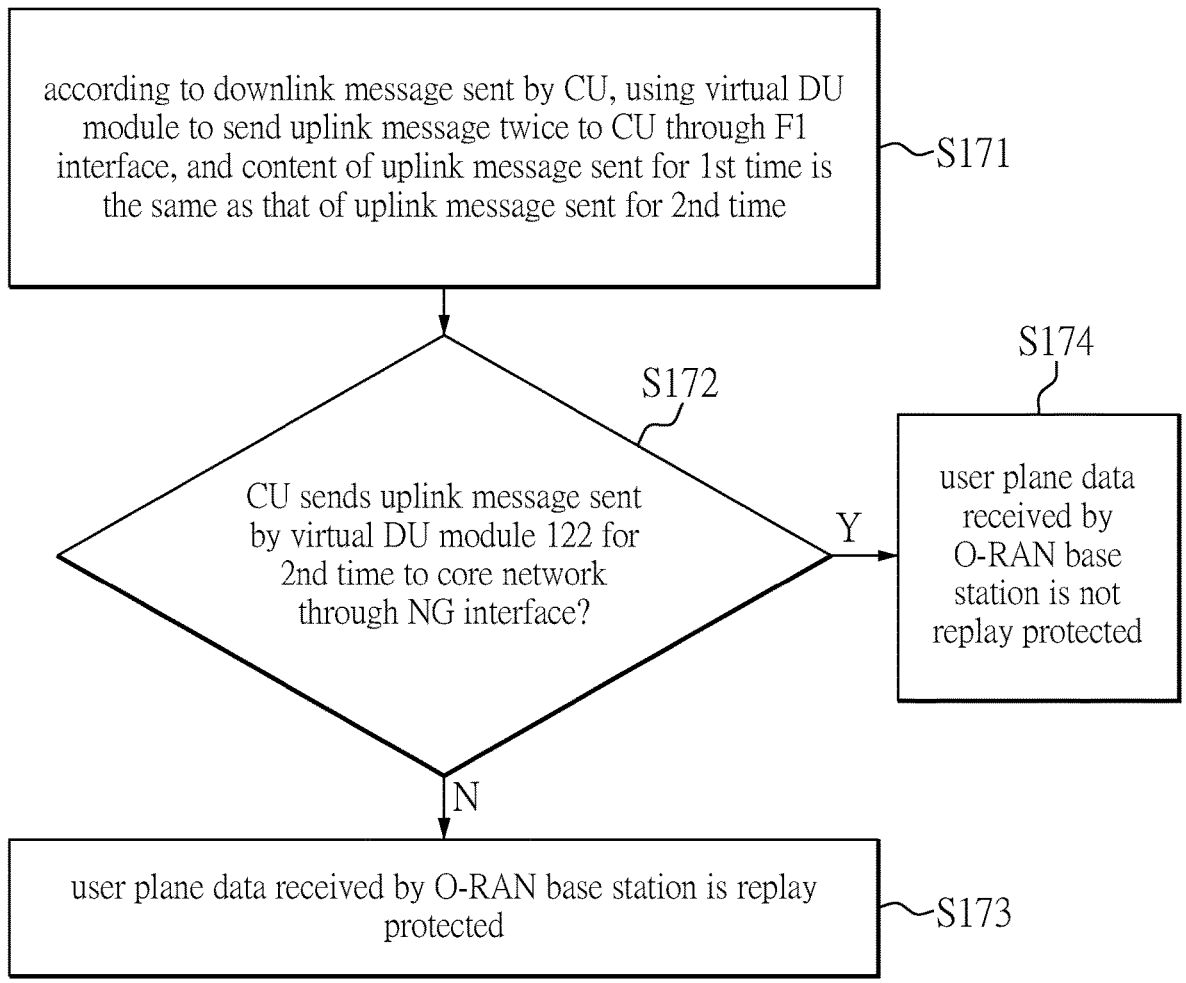
FIG. 17 is a flowchart showing that the processing device executes a user plane data replay test process according to one embodiment of the present disclosure.

Further, reference is made to FIG. 17, which is a flowchart showing that the processing device executes a user plane data replay test process according to one embodiment of the present disclosure. As shown in FIG. 17, in step S171, according to the downlink message M27 sent by the CU 201, the processing device 12 can use the virtual DU module 122 to send the uplink message M18 twice to the CU 201 through the F1 interface, and a content of the uplink message M18 sent for the first time is the same as that of the uplink message M18 sent for the second time. Next, in step S172, the processing device 12 determines whether or not the CU 201 sends the uplink message M18 sent by the virtual DU module 122 for the second time to the core network 30 through the NG interface. If the determination is negative, the processing device 12 executes step S173; otherwise, the processing device 12 executes step S174.

In step S173, in response to determining that the CU 201 does not send the uplink message M18 sent by the virtual DU module 122 for the second time to the core network 30 through the NG interface, the processing device 12 can determine that the user plane data received by the O-RAN base station 20 is replay protected. In addition, in step S174, in response to determining that the CU 201 sends the uplink message M18 sent by the virtual DU module 122 for the second time to the core network 30 through the NG interface, the processing device 12 can determine that the user plane data received by the O-RAN base station 20 is not replay protected. Similarly, after step S173 or S174, the processing device 12 can also be configured to generate an information security test report to indicate whether or not the user plane data received by the O-RAN base station 20 is replay protected. Since the details are the same as the above-mentioned embodiments, repetitive descriptions are omitted hereinafter.

In conclusion, in the present disclosure, the processing device can generate a virtual DU module by a network component software simulator (e.g., DuSIM), and information security tests of tampering and replay can be implemented through a wired data transmission interface (i.e., F1 interface). Since the processing device uses the virtual DU module to perform data transmission with the CU of the O-RAN base station through the F1 interface, an object on which the information security test of the present disclosure is performed is the CU of the O-RAN base station, and there is no need to perform information security tests by a UE through wireless transmission.

Furthermore, the virtual DU module provided/generated by the processing device can cover functions of the UE and a physical DU, and can directly analyze messages sent by the CU of the O-RAN base station, thus the information security tests in the present disclosure can be performed without any professional test equipment. In addition, in the present disclosure, the processing device can read the instructions stored in the memory to execute various processes, so as to complete multiple information security testing items for the O-RAN base station in faster manners. Therefore, in the present disclosure, a complete and effective information security testing technique is provided on the basis of following 5G international standards (e.g., 3GPP TS 33.511).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An information security testing method of an open radio access network (O-RAN) base station, the information security testing method comprising:
   configuring a processing device to generate a virtual distribution unit (DU) module and execute an F1 setting process for the virtual DU module, so as to communicatively connect the virtual DU module to a central unit (CU) of the O-RAN base station through an F1 interface, wherein the CU is configured to communicatively connect a core network through an NG interface in response to the F1 setting process being executed;
   configuring the processing device to execute a radio resource control (RRC) setting process for the virtual DU module, so as to designate the virtual DU module and the CU to perform data transmission through the F1 interface;
   configuring the processing device to execute an RRC signaling integrity test process to determine whether or not an RRC signaling sent by the CU is integrity protected; and
   in response to determining that the RRC signaling sent by the CU is integrity protected, configuring the processing device to execute an RRC signaling security test process, wherein the RRC signaling security test process includes one or more of an RRC signaling tampering test process and an RRC signaling replay test process;
   wherein the RRC signaling tampering test process is executed to determine whether or not the O-RAN base station has correctly processed the received RRC signaling that triggers an integrity check failure, and the RRC signaling replay test process is executed to determine whether or not the received RRC signaling received by the O-RAN base station is replay protected.

2. The information security testing method according to claim 1, wherein the step of configuring the processing device to execute the RRC signaling integrity test process further includes:
   in response to determining that the virtual DU module receives a security mode command message sent by the CU through the F1 interface, determining whether or not the security mode command message includes a message authentication code for integrity (MAC-I); and
   in response to determining that the security mode command message includes the MAC-I, determining that the RRC signaling sent by the CU is integrity protected.

3. The information security testing method according to claim 2, further comprising the following steps that are performed before the virtual DU module receives the security mode command message sent by the CU:

configuring the processing device to use a message extractor to extract an initial context setup request message sent by the core network to the CU through the NG interface.

4. The information security testing method according to claim 3, further comprising:
in response to determining that the RRC signaling sent by the CU is integrity protected, configuring the processing device to obtain a key from the initial context setup request message, and to derive an RRC integrity key from the key; and
configuring the processing device to verify whether or not a value of the MAC-I included in the security mode command message is correct through the RRC integrity key.

5. The information security testing method according to claim 4, wherein the step of configuring the processing device to execute the RRC signaling tampering test process further includes:
configuring, according to the security mode command message sent by the CU, the virtual DU module to send a security mode complete message that does not include the MAC-I or includes the MAC-I with an incorrect value to the CU through the F1 interface;
determining whether or not the virtual DU module receives a user equipment (UE) capability enquiry message sent by the CU through the F1 interface within a first time interval after sending the security mode complete message; and
in response to determining that the virtual DU module does not receive the UE capability enquiry message within the first time period, determining that the O-RAN base station has correctly processed the received RRC signaling that triggers the integrity check failure.

6. The information security testing method according to claim 5, wherein the step of configuring the processing device to execute the RRC signaling replay test process further includes:
configuring, according to the security mode command message sent by the CU, the virtual DU module to send the security mode complete message twice to the CU through the F1 interface, wherein a content of the security mode complete message sent for a first time is the same as that of the security mode complete message sent for a second time;
determining whether or not the CU sends the corresponding UE capability enquiry message for the security mode complete message sent by the virtual DU module for the second time; and
in response to determining that the CU does not send the corresponding UE capability enquiry message for the security mode complete message sent by the virtual DU module for the second time, determining that the RRC signaling received by the O-RAN base station is replay protected.

7. The information security testing method according to claim 6, further comprising the following steps that are performed before configuring the processing device to execute the RRC signaling security test process:
configuring the processing device to execute an RRC signaling encryption test process, wherein the RRC signaling encryption test process is executed to determine whether or not the RRC signaling sent by the CU is encrypted;
wherein the step of configuring the processing device to execute the RRC signaling encryption test process includes:
in response to determining that the virtual DU module receives the security mode command message sent by the CU through the F1 interface, determining whether or not the security mode command message includes an encryption protection algorithm; and
in response to determining that the security mode command message includes the encryption protection algorithm, determining that the RRC signaling sent by the CU is encrypted.

8. The information security testing method according to claim 6, further comprising:
in response to the virtual DU module receiving an RRC reconfiguration message sent by the CU through the F1 interface, and a user plane integrity protection of the RRC reconfiguration message being enabled, configuring the processing device to use the virtual DU module to send a corresponding RRC reconfiguration complete message to the CU through the F1 interface; and
configuring the processing device to execute a user plane data integrity test process to determine whether or not user plane data sent by the CU is integrity protected;
wherein the step of configuring the processing device to execute the user plane data integrity test process includes:
in response to determining that the virtual DU module receives a downlink message sent by the CU through the F1 interface, determining whether or not the downlink message includes the MAC-I; and
in response to determining that the downlink message includes the MAC-I, determining that the user plane data sent by the CU is integrity protected.

9. The information security testing method according to claim 8, further comprising:
in response to determining that the user plane data sent by the CU is integrity protected, configuring the processing device to execute a user plane data security test process, wherein the user plane data security test process includes one or more of a user plane data tampering test process and a user plane data replay test process;
wherein the user plane data tampering test process is executed to determine whether or not the O-RAN base station has correctly processed the received user plane data that triggers an integrity check failure, and the user plane data replay test process is executed to determining whether or not the user plane data received by the O-RAN base station is replay protected.

10. The information security testing method according to claim 9, wherein the step of configuring the processing device to execute the user plane data tampering test process further includes:
configuring, according to the downlink message sent by the CU, the virtual DU module to send an uplink message that does not include the MAC-I or includes the MAC-I with an incorrect value to the CU through the F1 interface;
determining whether or not the CU sends the uplink message to the core network through the NG interface within a second time period after the virtual DU module sends the uplink message; and
in response to determining that the CU does not send the uplink message to the core network through the NG interface within the second time period, determining that the O-RAN base station has correctly processed the received user plane data that triggers the integrity check failure.

11. The information security testing method according to claim 10, wherein the step of configuring the processing device to execute the user plane data replay test process further includes:
configuring, according to the downlink message sent by the CU, the virtual DU module to send the uplink message twice to the CU through the F1 interface, wherein a content of the uplink message sent for a first time is the same as that of the uplink message sent for a second time;
determining whether or not the CU sends the uplink message sent by the virtual DU module for the second time to the core network through the NG interface; and
in response to determining that the CU sends the uplink message sent by the virtual DU module for the second time to the core network through the NG interface, determining that the user plane data received by the O-RAN base station is replay protected.

12. The information security testing method according to claim 11, further comprising the following steps that are performed before configuring the processing device to execute the user plane data security test process:
configuring the processing device to execute a user plane data encryption test process, wherein the user plane data encryption test process is executed to determine whether or not the user plane data sent by the CU is encrypted;
wherein the step of configuring the processing device to execute the user plane data encryption test process further includes:
in response to determining that the virtual DU module receives the downlink message sent by the CU through the F1 interface, determining whether or not the downlink message includes an encryption protection algorithm; and
in response to determining that the downlink message includes the encryption protection algorithm, determining that the user plane data sent by the CU is encrypted.

13. An information security testing system of an open radio access network (O-RAN) base station, the information security testing system comprising:
a memory configured to store a plurality of instructions; and
a processing device coupled to the memory, wherein the processing device is configured to read the instructions to:
generate a virtual distribution unit (DU) module and execute an F1 setting process for the virtual DU module, so as to communicatively connect the virtual DU module to a central unit (CU) of the O-RAN base station through an F1 interface, wherein the CU is configured to communicatively connect a core network through an NG interface in response to the F1 setting process being executed;
execute a radio resource control (RRC) setting process for the virtual DU module, so as to designate the virtual DU module and the CU to perform data transmission through the F1 interface;
execute an RRC signaling integrity test process to determine whether or not an RRC signaling sent by the CU is integrity protected; and
in response to determining that the RRC signaling sent by the CU is integrity protected, execute an RRC signaling security test process, wherein the RRC signaling security test process includes one or more of an RRC signaling tampering test process and an RRC signaling replay test process;
wherein the RRC signaling tampering test process is executed to determine whether or not the O-RAN base station has correctly processed the received RRC signaling that triggers an integrity check failure, and the RRC signaling replay test process is executed to determine whether or not the received RRC signaling received by the O-RAN base station is replay protected.

14. The information security testing system according to claim 13, wherein in the step of executing the RRC signaling integrity test process, the processing device is further configured to perform:
in response to determining that the virtual DU module receives a security mode command message sent by the CU through the F1 interface, determining whether or not the security mode command message includes a message authentication code for integrity (MAC-I); and
in response to determining that the security mode command message includes the MAC-I, determining that the RRC signaling sent by the CU is integrity protected.

15. The information security testing system according to claim 14, wherein, before the virtual DU module receives the security mode command message sent by the CU, the processing device is further configured to:
use a message extractor to extract an initial context setup request message sent by the core network to the CU through the NG interface.

16. The information security testing system according to claim 15, wherein, in response to determining that the RRC signaling sent by the CU is integrity protected, the processing device is further configured to:
obtain a key from the initial context setup request message, and derive an RRC integrity key from the key; and
verify whether or not a value of the MAC-I included in the security mode command message is correct through the RRC integrity key.

17. The information security testing system according to claim 16, wherein in the step of executing the RRC signaling tampering test process, the processing device is further configured to perform:
configuring, according to the security mode command message sent by the CU, the virtual DU module to send a security mode complete message that does not include the MAC-I or includes the MAC-I with an incorrect value to the CU through the F1 interface;
determining whether or not the virtual DU module receives a user equipment (UE) capability enquiry message sent by the CU through the F1 interface within a first time interval after sending the security mode complete message; and
in response to determining that the virtual DU module does not receive the UE capability enquiry message within the first time period, determining that the O-RAN base station has correctly processed the received RRC signaling that triggers the integrity check failure.

18. The information security testing system according to claim 17, wherein in the step of executing the RRC signaling replay test process, the processing device is further configured to perform:
configuring, according to the security mode command message sent by the CU, the virtual DU module to send the security mode complete message twice to the CU through the F1 interface, wherein a content of the security mode complete message sent for a first time is the same as that of the security mode complete message sent for a second time;

determining whether or not the CU sends the corresponding UE capability enquiry message for the security mode complete message sent by the virtual DU module for the second time; and in response to determining that the CU does not send the corresponding UE capability enquiry message for the security mode complete message sent by the virtual DU module for the second time, determining that the RRC signaling received by the O-RAN base station is replay protected.

19. The information security testing system according to claim 18, wherein, before executing the RRC signaling security test process, the processing device is further configured to:

execute an RRC signaling encryption test process, wherein the RRC signaling encryption test process is executed to determine whether or not the RRC signaling sent by the CU is encrypted;

wherein the step of configuring the processing device to execute the RRC signaling encryption test process includes:

in response to determining that the virtual DU module receives the security mode command message sent by the CU through the F1 interface, determining whether or not the security mode command message includes an encryption protection algorithm; and in response to determining that the security mode command message includes the encryption protection algorithm, determining that the RRC signaling sent by the CU is encrypted.

20. The information security testing system according to claim 18, wherein the processing device is further configured to:

in response to the virtual DU module receiving an RRC reconfiguration message sent by the CU through the F1 interface, and a user plane integrity protection of the RRC reconfiguration message being enabled, use the virtual DU module to send a corresponding RRC reconfiguration complete message to the CU through the F1 interface; and execute a user plane data integrity test process to determine whether or not user plane data sent by the CU is integrity protected;

wherein the step of configuring the processing device to execute the user plane data integrity test process includes:

in response to determining that the virtual DU module receives a downlink message sent by the CU through the F1 interface, determining whether or not the downlink message includes the MAC-I; and in response to determining that the downlink message includes the MAC-I, determining that the user plane data sent by the CU is integrity protected.

21. The information security testing system according to claim 20, wherein the processing device is further configured to:

in response to determining that the user plane data sent by the CU is integrity protected, execute a user plane data security test process, wherein the user plane data security test process includes one or more of a user plane data tampering test process and a user plane data replay test process;

wherein the user plane data tampering test process is executed to determine whether or not the O-RAN base station has correctly processed the received user plane data that triggers an integrity check failure, and the user plane data replay test process is executed to determining whether or not the user plane data received by the O-RAN base station is replay protected.

22. The information security testing system according to claim 21, wherein, in the step of executing the user plane data tampering test process, the processing device is further configured to perform:

configuring, according to the downlink message sent by the CU, the virtual DU module to send an uplink message that does not include the MAC-I or includes the MAC-I with an incorrect value to the CU through the F1 interface;

determining whether or not the CU sends the uplink message to the core network through the NG interface within a second time period after the virtual DU module sends the uplink message; and in response to determining that the CU does not send the uplink message to the core network through the NG interface within the second time period, determining that the O-RAN base station has correctly processed the received user plane data that triggers the integrity check failure.

23. The information security testing system according to claim 22, wherein, in the step of executing the user plane data replay test process, the processing device is further configured to perform:

configuring, according to the downlink message sent by the CU, the virtual DU module to send the uplink message twice to the CU through the F1 interface, wherein a content of the uplink message sent for a first time is the same as that of the uplink message sent for a second time;

determining whether or not the CU sends the uplink message sent by the virtual DU module for the second time to the core network through the NG interface; and in response to determining that the CU sends the uplink message sent by the virtual DU module for the second time to the core network through the NG interface, determining that the user plane data received by the O-RAN base station is replay protected.

24. The information security testing system according to claim 23, wherein, before executing the user plane data security test process, the processing device is further configured to perform:

configuring the processing device to execute a user plane data encryption test process, wherein the user plane data encryption test process is executed to determine whether or not the user plane data sent by the CU is encrypted;

wherein the step of configuring the processing device to execute the user plane data encryption test process further includes:

in response to determining that the virtual DU module receives the downlink message sent by the CU through the F1 interface, determining whether or not the downlink message includes an encryption protection algorithm; and in response to determining that the downlink message includes the encryption protection algorithm, determining that the user plane data sent by the CU is encrypted.

* * * * *